US012156851B1

(12) United States Patent
Elahi et al.

(10) Patent No.: US 12,156,851 B1
(45) Date of Patent: Dec. 3, 2024

(54) SYSTEMS AND METHODS OF PHARMACEUTICAL ADMINISTRATION

(71) Applicant: Dignity Health, San Francisco, CA (US)

(72) Inventors: Cyrus Elahi, San Francisco, CA (US); James Forseth, San Francisco, CA (US); Dakota Graham, San Francisco, CA (US); Sarah McBryan, San Francisco, CA (US)

(73) Assignee: Dignity Health, San Francisco, CA (US)

( * ) Notice: Subject to any disclaimer, the term of this patent is extended or adjusted under 35 U.S.C. 154(b) by 173 days.

(21) Appl. No.: 17/816,384

(22) Filed: Jul. 29, 2022

Related U.S. Application Data

(60) Provisional application No. 63/226,963, filed on Jul. 29, 2021.

(51) Int. Cl.
*A61J 1/20* (2006.01)
*A61J 7/00* (2006.01)

(52) U.S. Cl.
CPC ........... *A61J 1/2096* (2013.01); *A61J 7/0007* (2013.01)

(58) Field of Classification Search
CPC ...... A61J 1/2096; A61J 7/0007; A61J 7/0053; A61J 3/075; A61J 3/074; A61J 7/0061; A61J 3/07; A61M 5/1782; A61M 5/24; A61M 2005/2437; A61M 5/2425; A61M 5/2466
See application file for complete search history.

(56) References Cited

U.S. PATENT DOCUMENTS 3,314,429 A * 4/1967 Boehm .................... A61J 1/067 604/206
4,840,618 A * 6/1989 Marvel ............... A61M 5/3213 604/263
5,123,915 A * 6/1992 Miller .................... A61J 7/0053 606/236
5,158,558 A * 10/1992 Melker ................. A61J 1/2096 604/905
6,006,798 A * 12/1999 Lindquist ............ A61M 5/1782 141/369
6,162,199 A * 12/2000 Geringer ............. A61M 5/1782 604/407
9,861,578 B1 * 1/2018 Busiashvili ............... A61J 1/22
2003/0055395 A1 * 3/2003 Manera ................. A61J 1/2096 604/82
2015/0083626 A1 * 3/2015 Dallman .............. B65D 51/002 206/438
2016/0354282 A1 * 12/2016 Macy, Jr. ................ A61J 3/002
2019/0080808 A1 * 3/2019 Schreuder ............ G21G 1/0005

FOREIGN PATENT DOCUMENTS

GB 491596 A * 9/1938 .............. A61J 1/067

* cited by examiner

*Primary Examiner* — Sarah Al Hashimi
*Assistant Examiner* — Arjuna P Chatrathi
(74) *Attorney, Agent, or Firm* — Polsinelli PC

(57) ABSTRACT

A device is disclosed that secures a capsule and accommodates puncturing of the capsule and extraction of a medication. The device includes a cavity that receives and secures the capsule. The device includes at least one opening that provides access to the cavity for extraction of the capsule contents.

20 Claims, 33 Drawing Sheets

100

300

SYSTEMS AND METHODS OF PHARMACEUTICAL ADMINISTRATION

CROSS REFERENCE TO RELATED APPLICATIONS

This is a non-provisional application that claims benefit to U.S. Provisional Patent Application Ser. No. 62/226,963, filed on Jul. 29, 2021, which is herein incorporated by reference in its entirety.

FIELD

The present inventive concept relates in general to pharmaceutical devices and drug administration; and, more particularly, to systems, devices, and methods employed to safely extract medication from a capsule or pill.

BACKGROUND

Numerous neurovascular pathologies can result in a subarachnoid hemorrhage (SAH), a disease process often associated with significant morbidity and mortality. Part of the standard inpatient treatment protocol for SAH includes nimodipine. Nimodipine is a calcium channel blocking medication that helps prevent vasospasm in the brain. This drug is administered orally. Since many patients with SAH have significant neurologic deficits, the drug is often administered sublingually or through a patient's feeding tube by the health care team.

Nimodipine is a viscous liquid that either comes in a vial or in a capsule. Due to increased costs associated with the vial, many hospitals carry the capsule form of nimodipine. To extract the drug from the capsule, health care providers puncture the capsule twice with a needle, the second time extracting the capsule contents into a syringe.

The challenge for providers is safely extracting the liquid contents of the medication from the capsule. The current process requires providers to puncture the capsule twice. The first puncture creates an opening to facilitate flow of the capsule contents. The provider then makes a second puncture into the capsule with a needle attached to a syringe. They will then draw back on the syringe, emptying the contents of the capsule. This process carries inefficiencies and places the provider at risk of stick injuries. The puncturing of the thick ovoid capsule with a needle is not trivial. Without care, there is a high chance to slide off the capsule with the needle. By sliding off the capsule surface, the provider risks sticking themselves. Given the inexact process of manually puncturing holes into the capsule, there is also consistently <100% of the capsule contents being extracted into the syringe.

It is with these observations in mind, among others, that various aspects of the present disclosure were conceived and developed.

SUMMARY

Responsive to the various technical problems described herein among others, one example of the present inventive concept can take the form of a device for medication extraction. The device may include a first body and a second body. Moreover, the first body may define a first cavity and the second body may define a second cavity. For illustrative purposes only, the device may be configured and arranged to be positioned in a substantially open configuration and a substantially closed configuration. A securing mechanism may be positioned on at least one of the first body and the second body. There may be at least one channel defined through at least one of the first body and the second body, wherein the at least one channel may extend from an exterior surface to at least one of the first cavity and the second cavity.

In some examples, an alignment mechanism may be defined on at least one of the first body and the second body. If the first body and the second body are in the closed configuration, the alignment mechanism may be configured and arranged to align the engagement of the first body and the second body. By way of example only, the alignment mechanism may be comprised of a plurality of pins and a plurality of holes.

In some examples, the securing mechanism may be configured and arranged to secure the engagement of the first body and the second body. For demonstration purposes only, the securing mechanism may comprise at least one of a clip mechanism, a hinge mechanism, and a threaded mechanism.

In some examples, the first cavity and the second cavity may be configured and arranged to receive a pill. By way of example only, the closed configuration of the first body and the second body may comprise a pill cavity, wherein the pill cavity may be formed from the first cavity and the second cavity. Furthermore, the first cavity and the second cavity may comprise at least one recess.

In some examples, at least one of the first body and the second body may be textured. For example, the first body and the second body may be at least one of an integral configuration and a peripheral configuration. Similarly, the first body and the second body may comprise at least one of a rectangular configuration, a cylindrical configuration, a polygonal configuration, and an hourglass configuration.

In some examples, the first body and the second body may comprise a first channel and a second channel of the at least one channel. For the purposes of demonstration only, each of the first channels may be in communication with a first end of the first cavity and the second cavity. Moreover, each of the second channels may be in communication with a second end of the first cavity and the second cavity. If the first body and the second body are in the closed configuration, then a first needle canal may be formed from the first channel of the first body and the first channel of the second body. Further, a second needle canal may be formed from the second channel of the first body and the second channel of the second body. Solely for the purposes of illustration, the first needle canal and the second needle canal may be substantially positioned along the same axis.

In some examples, each of the at least one channels may comprise a receiving aperture. For example, the receiving aperture may be configured and arranged to receive a needle.

In some examples, a syringe interface may be defined on at least one of the first body and the second body. For demonstration purposes only, the syringe interface may be able to interface a syringe with the device.

In some examples, at least one puncture mechanism may be substantially adjacent to at least one of the first cavity and the second cavity. By way of example only, the puncture mechanism may be configured and arranged to puncture a pill.

In some examples, at least one cutting mechanism may be defined at least one of the first body and the second body. For example, the at least one cutting mechanism may be configured and arranged to cut a pill.

In one examples, a device for medication extraction can be provided. The device may include a body defining a cavity; a cap; and at least one channel, wherein the at least one channel may extend from an exterior surface to the cavity. By way of example only, the cap may be configured and arranged to engage an end of the body.

In some examples, the cap may comprise a securing mechanism. For the purpose of illustration only, the securing mechanism may comprise at least one of a clip mechanism, a hinge mechanism, and a threaded mechanism. In addition, the cap may comprise at least one puncture mechanism, wherein the at least one puncture mechanism may be configured and arranged to puncture a pill. By way of example only, the cap may be configured and arranged to secure a pill within the cavity when configured in a closed configuration. Moreover, the cap may be at least one of integral to the body and peripheral to the body.

In some examples, the cavity may be configured and arranged to receive a pill. For demonstration purposes only, the cavity may comprise at least one puncture mechanism, wherein the at least one puncture mechanism may be configured and arranged to puncture a pill.

In some examples, the body may be textured. Furthermore, for example, the at least one channel may comprise a receiving aperture, wherein the receiving aperture may be configured and arranged to receive a needle.

The present inventive concept may further take the form of a method for medicine extraction utilizing the device according to at least some of the embodiments described above. The method may include providing a device including a first body defining a first cavity, a second body defining a second cavity, at least one securing mechanism, and at least one channel. The method may also include engaging the first body and the second body, receiving a pill in the first cavity, receiving a pill in the second cavity, and receiving a needle in the at least one channel.

Furthermore, the method may include aligning the engagement of the first body and the second body utilizing an alignment mechanism. In addition, the method may also include, securing the engagement of the first body and the second body utilizing the at least one securing mechanism. Moreover, the body may comprise texturing.

In one example, the inventive concept can take the form of a device for medication extraction. The device includes a body defining a cavity, a securing mechanism, and at least one channel. As an example, the at least one channel may extend from an exterior surface to the cavity.

In some examples, the cavity of the device may be configured and arranged to accept a pill. Moreover, the cavity may comprise at least one recess.

In some examples, the securing mechanism may comprise at least one of a hinge mechanism, a clip mechanism, and an elastic mechanism. Furthermore, the securing mechanism may be configured and arranged to secure a pill to the cavity. Similarly, the securing mechanism may be configured and arranged to provide a biasing force to a pill.

In some examples, the body may be textured. Furthermore, for example, the at least one channel may comprise a receiving aperture, wherein the receiving aperture may be configured and arranged to receive a needle. In addition, the at least one channel may comprise at least one of a substantially open configuration and an enclosed configuration.

Additional objectives, advantages and novel features will be set forth in the description which follows or will become apparent to those skilled in the art upon examination of the drawings and detail description which follows.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Introduction:

Aspects of the present disclosure relate to examples of systems, devices, and/or methods for improved medication extraction. In general, the device is configured to secure, house, or otherwise receive a capsule or pill to accommodate puncture and extraction of a liquid providing medication or other benefit from the capsule. More particularly, examples of the device include a housing defining a cavity that receives and maintains the capsule in a fixed position relative to the housing, and the housing further includes at least one opening and a puncture arrangement to accommodate puncturing and extraction of the capsule while engaged within the cavity. The device provides safer and more efficient methods for extracting the medication from liquid capsules, by, e.g., reducing needle sticks and wasted medication during patient care, among other advantages. Referencing the Drawings, various non-limiting examples of devices and other aspects of the subject inventive concept are described.

Exemplary Systems and Devices:

Referring to FIGS. 1A-1H, a system 100 including a device is shown, designated device 102, that improves the extraction of medication (such as Nimodipine) from a capsule 103 or other such container. In general, as indicated, the device 102 includes a housing 104 defining a first side 106A and a second side 106B opposite the first side 106A. The housing 104 further defines a proximal portion 108A and a distal portion 108B on opposite ends of the housing 104 as shown. A typical capsule such as the capsule 103 shown or other such treatment element, includes liquid contents encapsulated within an encapsulating layer. As described herein, the device 102, by way of the housing 104 and other components, secures the capsule 103, accommodates one or more punctures to be applied to the capsule 103 through its encapsulating layer, and further facilitates extraction of the liquid contents from the capsule 103 so that the liquid contents of the capsule 103 can be administered (e.g., through a patient's feeding tube).

Figure 1A:
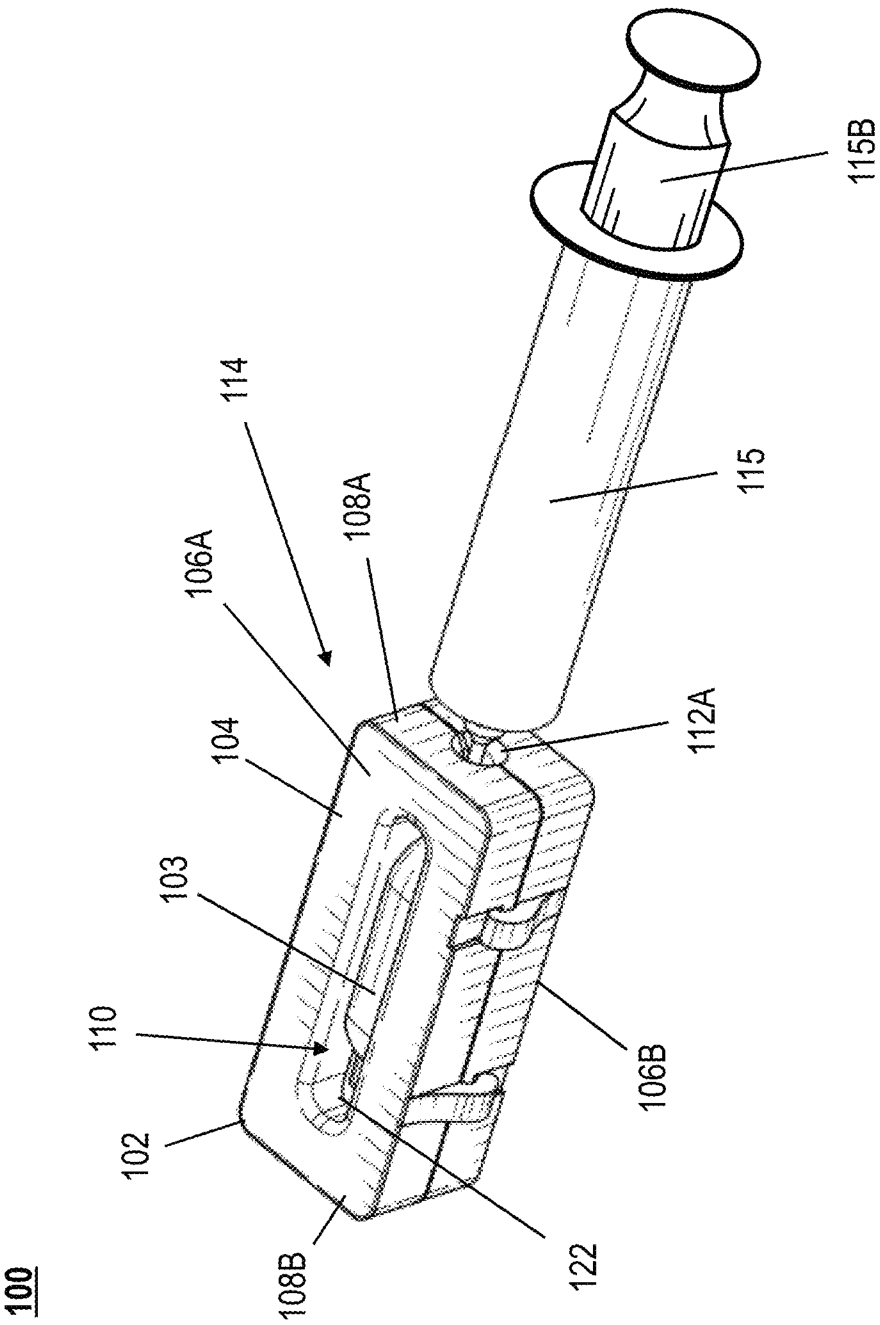
FIG. 1A is a perspective view of a system including one example of a device that facilitates medication (or liquid) extraction from a capsule or other such container.
Figure 1B:
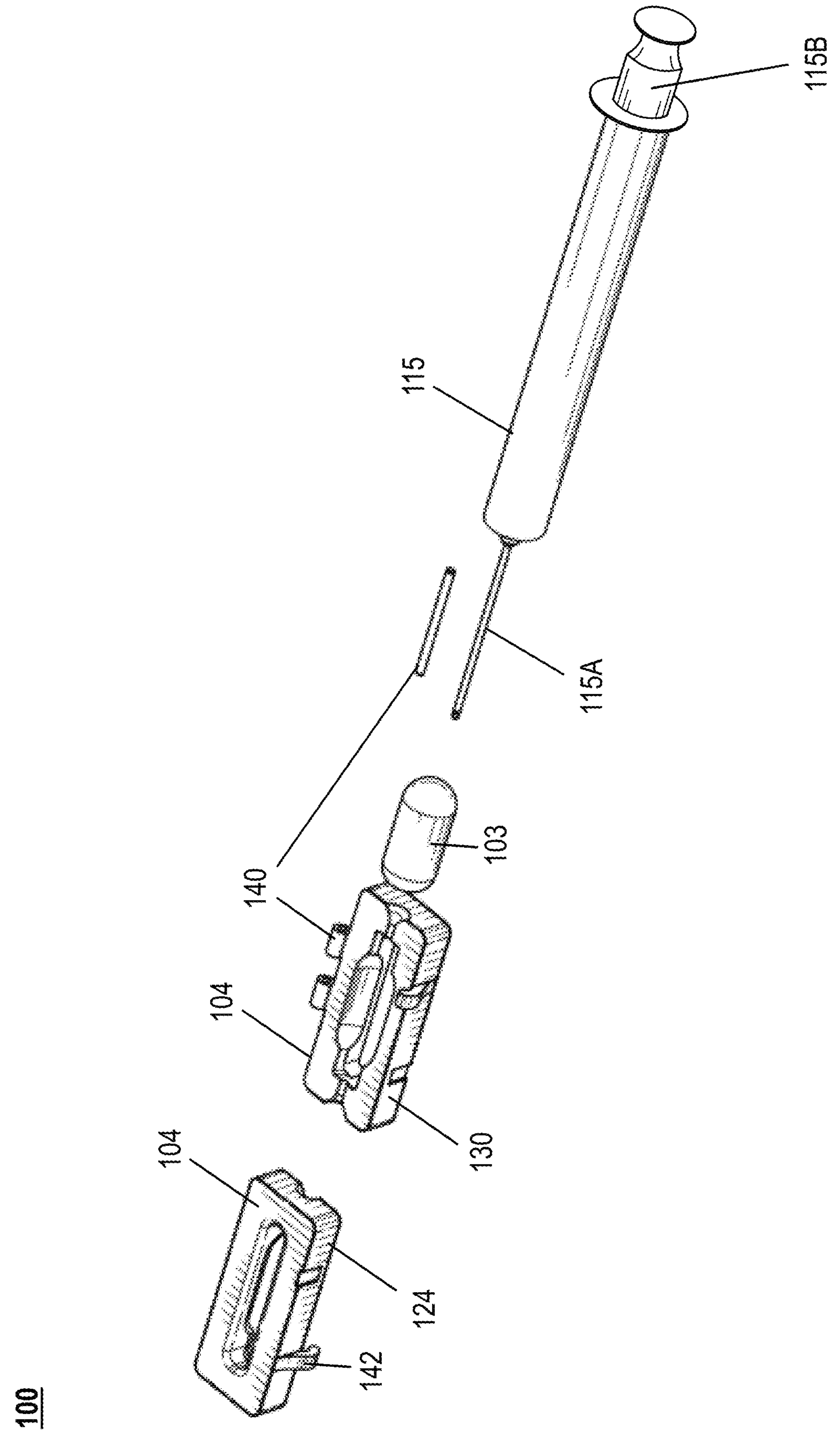
FIG. 1B is an exploded view of the system of FIG. 1A.
Figure 1C:
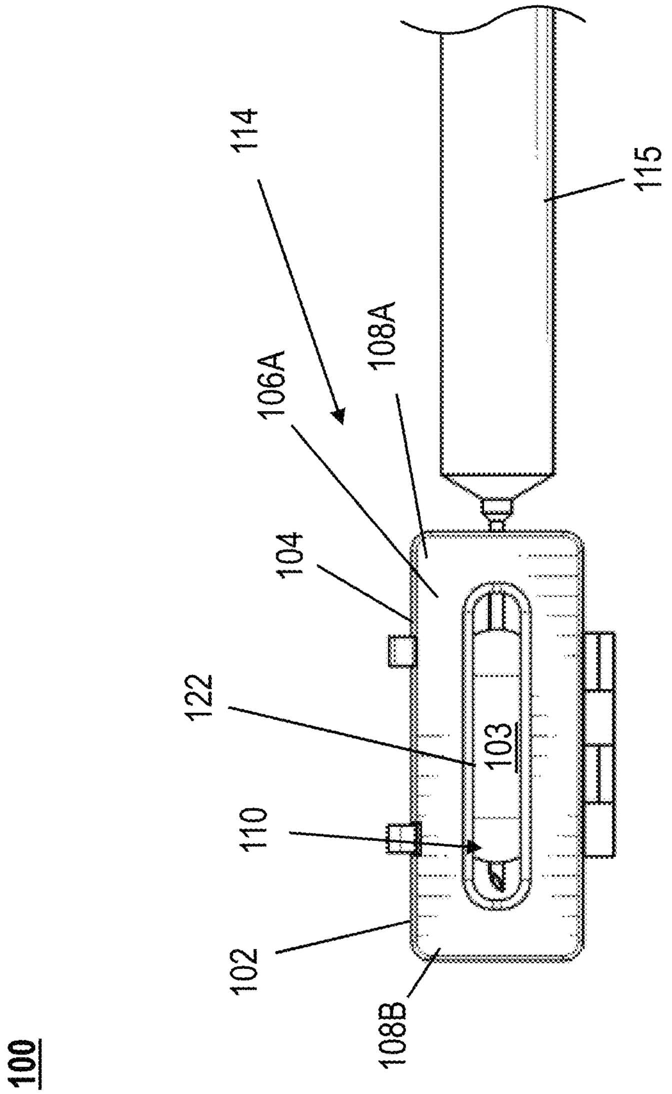
FIG. 1C is a top view of the system of FIG. 1A illustrating a needle of a needle-syringe unit engaged with the device of FIG. 1A.
Figure 1D:
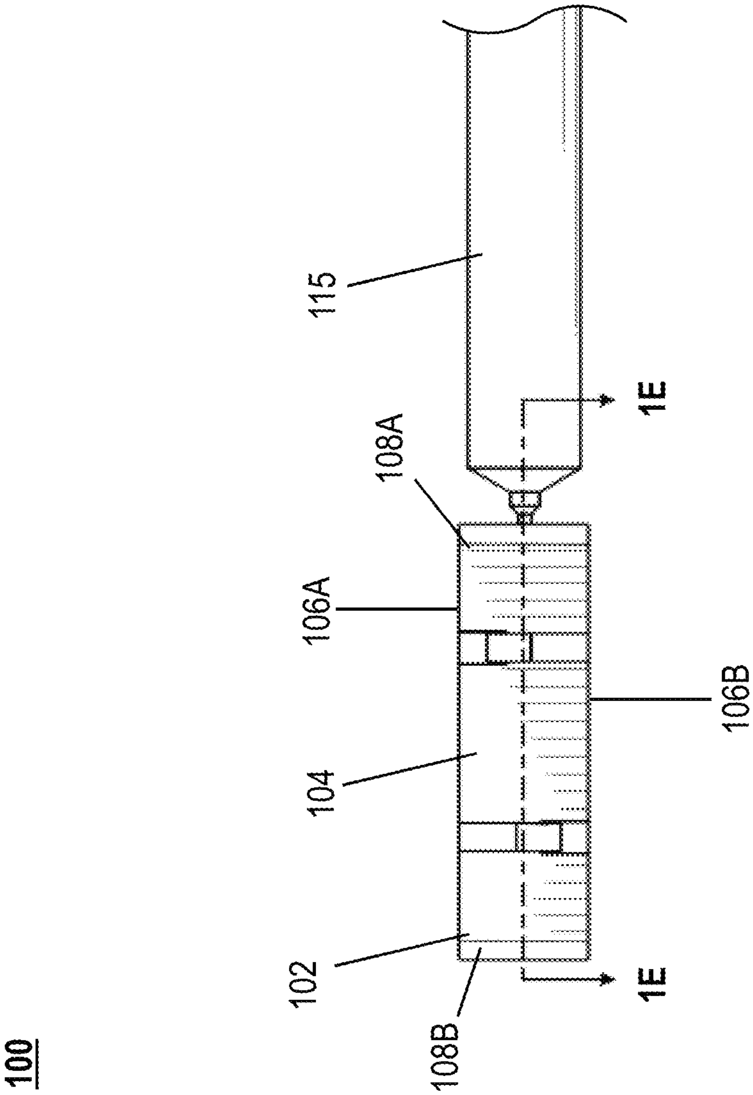
FIG. 1D is a side view of the device of FIG. 1A.
Figure 1E:
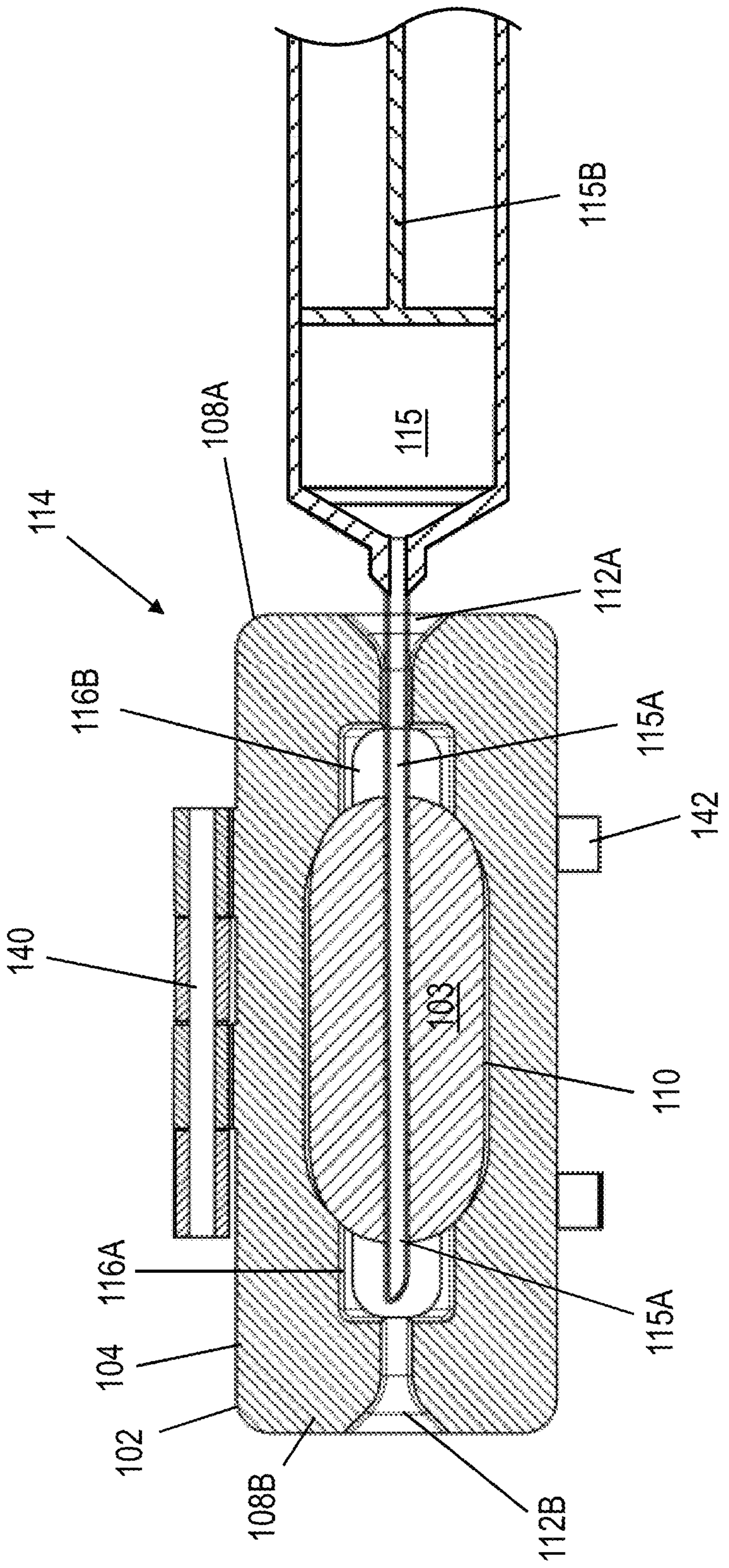
FIG. 1E is an enlarged cross-section of FIG. 1D taken along line 1E-1E of FIG. 1D.
Figure 1F:
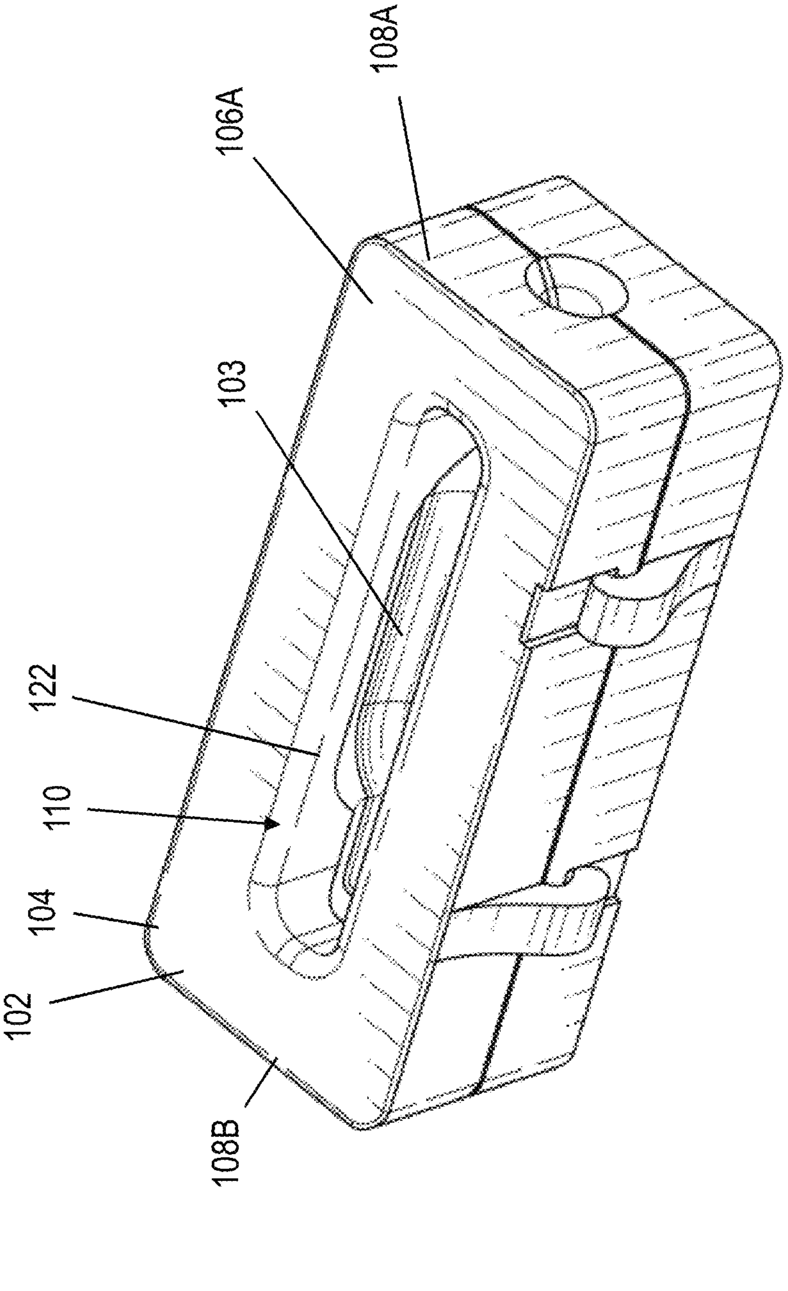
FIG. 1F is an isometric view of the device of FIG. 1A in a closed configuration.

As indicated, the device 102 includes a cavity 110 defined between the first side 106A of the housing 104 and the second side 106B as shown. The cavity 110 receives the capsule 103 or other such treatment element and maintains the capsule 103 in a fixed position relative to the housing 104. In general, the cavity 110 is formed with a shape configuration and dimensions suitable for receiving and securing the capsule 103 within the housing 104 as indicated in FIG. 1F. The device 102 further includes at least one of an opening 112 formed along the housing 104 that provides access to the cavity 110. In FIG. 1A for example, opening 112A is formed along the proximal portion 108A and provides access to the cavity 110 for extraction, puncturing, etc.

In addition, the device 102 includes a puncture arrangement 114 defined along the housing 104. The puncture arrangement 114 is defined by structure and/or space (e.g., openings and/or channels) along the housing 104 that generally accommodates at least one puncture of the capsule 103 as well as efficient and safe extraction of the liquid contents and/or treatment from the capsule 103. As described herein, the puncture arrangement 114 can include different examples, sub-examples, and variations. Referring to FIG. 1D, in some examples, the puncture arrangement 114 defines a needle channel defined collectively by the cavity 110 and the opening 112A and accommodates the entry and passage of a needle 115A of a needle-syringe unit 115 through the proximal portion 108A of the housing 104A and into the cavity 110 in the manner shown. Providing entry of the needle 115A into the cavity 110 in this manner facilitates at least one puncture of the capsule 103 while the capsule 103 is secured in the cavity 110. In some examples, the puncture arrangement 114 is configured to receive the needle 115A of the needle-syringe unit 115 through the first opening 112A and into the cavity 110 thereby puncturing the capsule 103. The puncture arrangement 114 may further be configured to accommodate passage of the needle 115A beyond the cavity 110 entirely through the capsule 103 as shown accommodating a first puncture and a second puncture along different sides of the capsule 103 to improve extraction from an interior of the capsule 103. In such examples, the housing 104 may further include at least one of a recess 116 formed within the housing 104 along opposite ends of the cavity 110. As indicated in FIG. 1E, a recess 116A may be formed within the housing 104 and in communication with the cavity 110 opposite the first opening 112A along the distal portion 108B, the recess 116A permitting passage of the needle 115A through an entire length of the cavity 110 to accommodate a puncture of the capsule 103 along the distal portion 108B of the housing 104 opposite the proximal portion 108A. As further indicated in FIG. 1E, the housing 104 may include an opening 112B formed along the distal portion 108B of the housing 104 in communication with the recess 116A. When implemented, the opening 112B provides further passage of the needle 115A from the proximal portion 108A to a terminal end of the distal portion 108B of the housing 104 and forms a part of the puncture arrangement 114. Further, as shown, the needle-syringe unit 115 can include a plunger 115B that enables a practitioner to draw liquid from the capsule 103 and into the needle-syringe unit 115.

In other examples, the puncture arrangement 114 can include an integrated needle (examples shown in FIGS. 10A-10B) positioned along the housing 104. In these examples, the integrated needle is defined by the puncture arrangement 114 along the housing 104 such that the integrated needle is in communication with the cavity 110 and provides a needle, protrusion, edge, tip, or other such structure suitable for puncturing the capsule 103 without an external needle such as the needle 115A, or without the needle 115A needing to pass entirely through the capsule 103. In such examples the integrated needle may further define a syringe port so that a syringe can be engaged along the integrated needle for extraction.

As previously described, and further demonstrated by other examples herein, the housing 104 may include any number or type of opening 112 to provide access to the cavity 110, to provide a release/removal system for the capsule 103, and the like. In some examples as shown in FIG. 1A, the housing 104 may include a window 122 formed along the first side 106A. The window 122 allows a clinician to observe the puncturing and extraction of the capsule 103 and can further assist with guiding the needle 115A through any opening 112 and into the cavity 110.

Figure 1G:
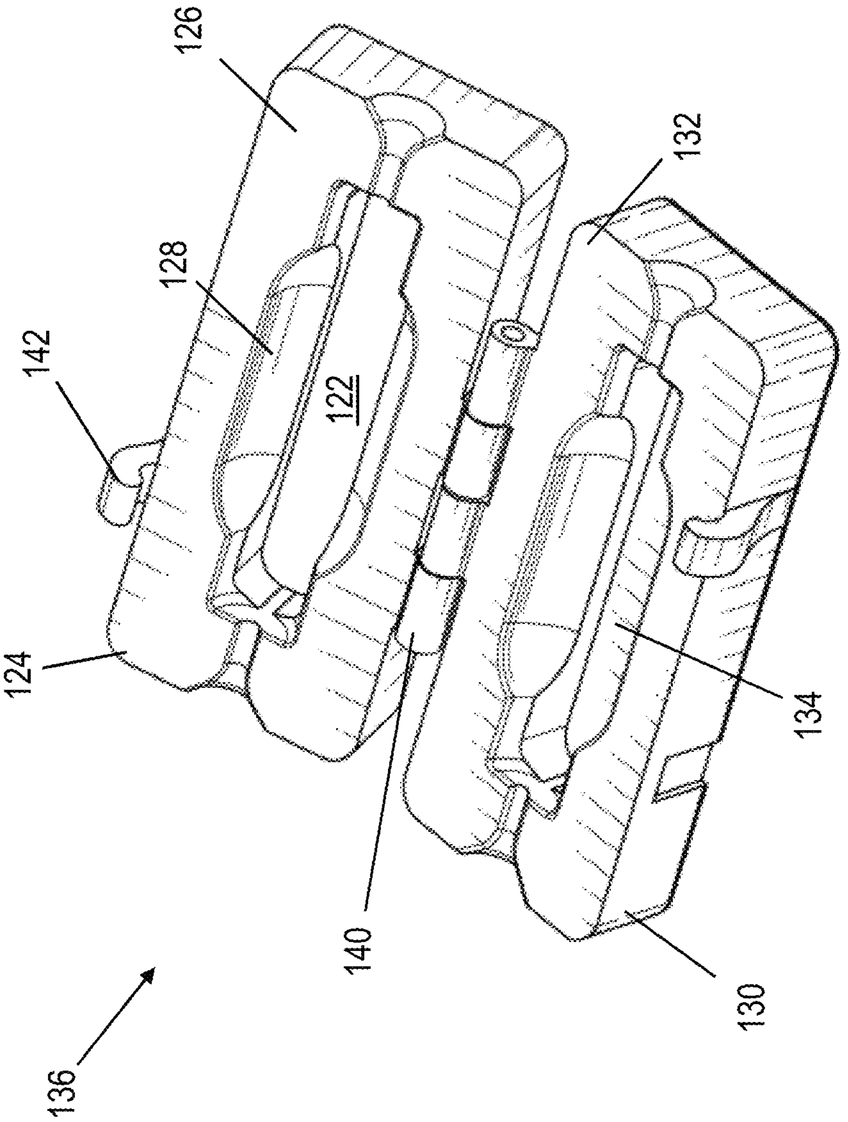
FIG. 1G is an isometric view of the device of FIG. 1A in an open configuration for receiving a capsule.
Figure 1H:
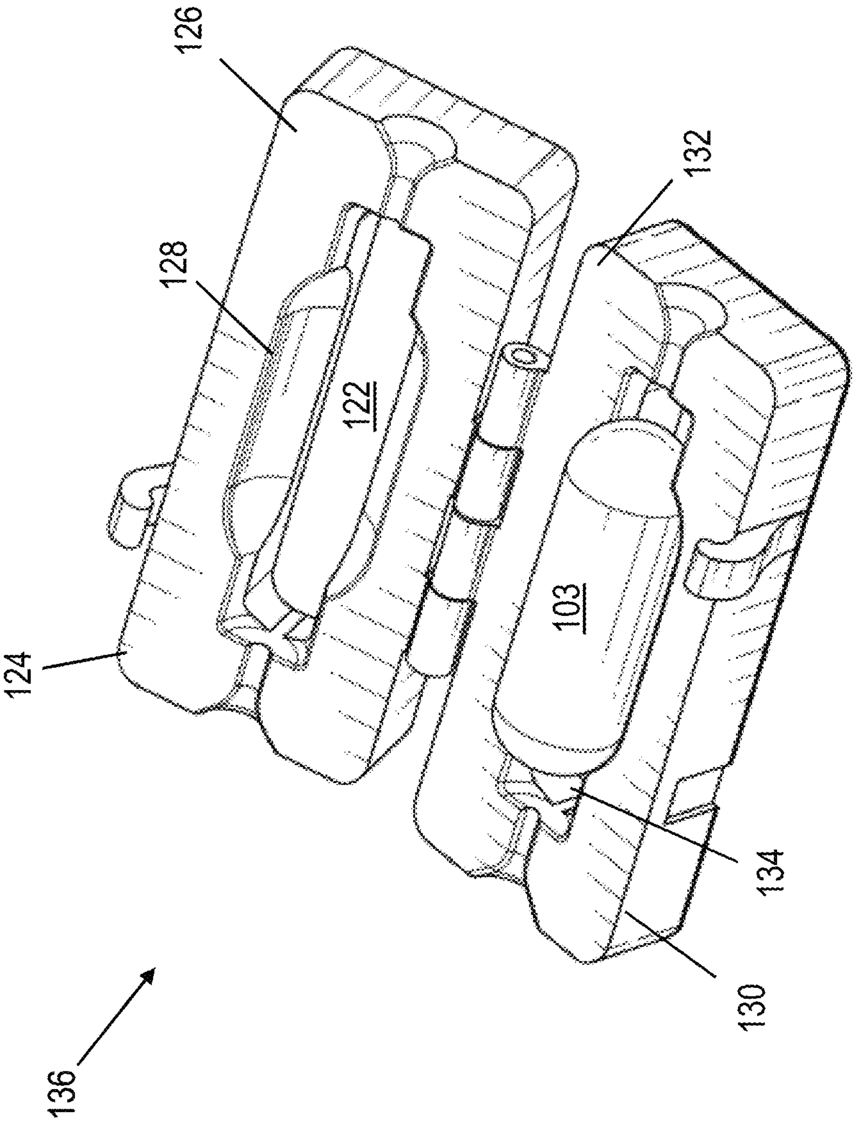
FIG. 1H is an isometric view of the device of FIG. 1A in the open configuration with a capsule cavity received or otherwise disposed along a cavity of a housing defined by the device.
Figure 1I:
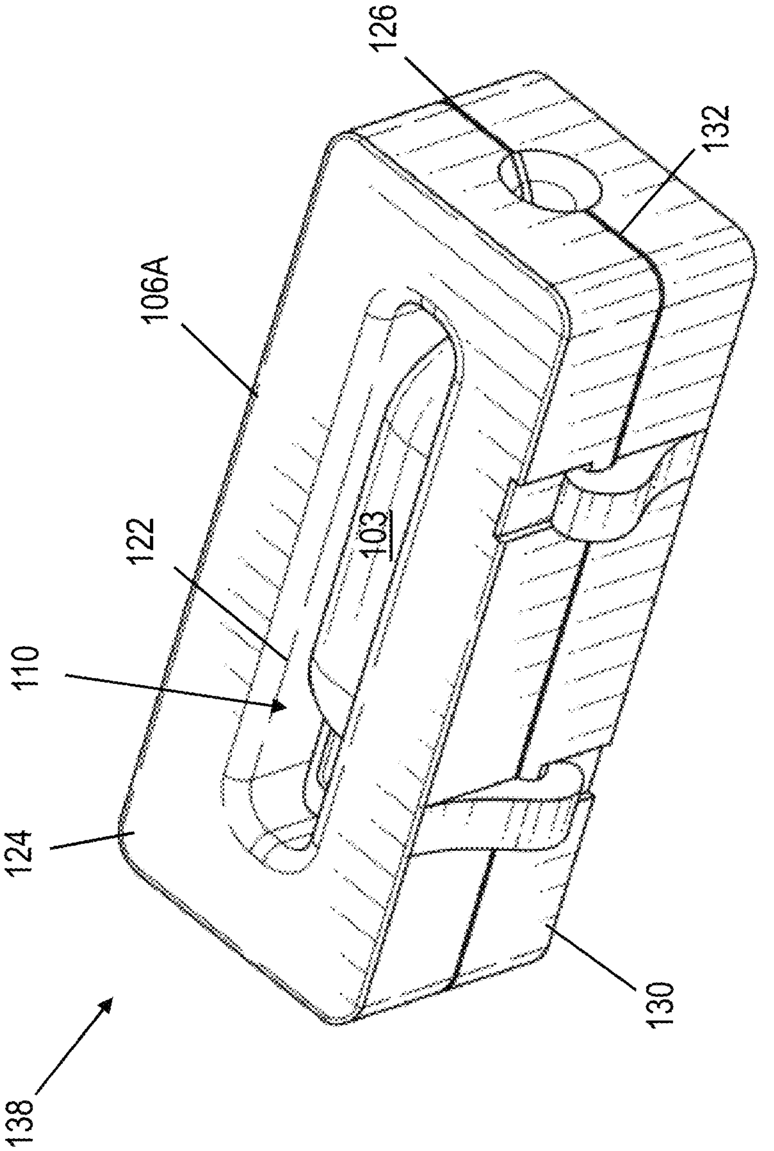
FIG. 1I is an isometric view of the device of FIG. 1A in the closed configuration with the capsule of FIG. 1H seated along the cavity and secured for extraction.

Referring to FIG. 1G, examples of the housing 104 may include two discrete housing components, designated first body 124, and second body 130. In these examples, the first body 124 includes an interior side 126 and an indentation 128 formed along the interior side 126 of the first body 124. Similarly, the second body 130 includes an interior side 132 and an indentation 134 formed along the interior side 132 of the second body 130. In general, the first body 124 and the second body 130 are formed with similar shape and size dimensions so that they can be brought together in the manner shown (e.g., FIGS. 11-1H) and secure the capsule 103.

In some examples, the first body 124 and the second body 130 are configured and arranged to be positioned in a substantially open configuration 136 and a substantially closed configuration 138. In the closed configuration 138 shown in FIG. 1F, the interior side 126 of the first body 124 is positioned flush with the interior side 132 of the second body in the manner shown. This positioning of the first body 124 relative to the second body 130 forms the cavity 110; i.e., in the closed configuration 138 the indentation 128 is merged with the indentation 134 to form the cavity 110. As indicated, the first body 124 may be engaged to the second body 130 via a closure mechanism 140, such as a hinge. The device 102 may further include a securing mechanism 142, defining one or more clips, fasteners, and the like for maintaining the first body 124 and the second body 130 in the closed configuration 138.

Referring to FIGS. 2A-2D, a system 200 is shown including another example device 202 for puncture and extraction of a treatment element, such as a capsule 203 containing liquid (medical) contents. In this embodiment, the device 202 includes structure similar to the device 102 of FIG. 1A for securing and applying extraction to a capsule 203, but may further include flared end portions 250 and a pill removal opening 252 as described herein. In general, as indicated, the device 202 includes a housing 204 defining a first side 206A and a second side 206B opposite the first side 206A. The housing 204 further defines a proximal portion 208A and a distal portion 208B on opposite ends of the housing 204 as shown. A typical capsule such as the capsule 203 shown or other such treatment element, includes liquid contents encapsulated within an encapsulating layer. As described herein, the device 202, by way of the housing 204 and other components, secures the capsule 203, accommodates two or more punctures to be applied to the capsule 203, and further facilitates extraction of the liquid contents from the capsule 203 so that the liquid contents of the capsule 203 can be administered (e.g., through a patient's feeding tube).

As indicated, the device 202 includes a cavity 210 that receives the capsule 203 or other such treatment element and maintains the capsule 203 in a fixed position relative to the housing 204 for puncture and extraction thereof. In addition, the device 202 includes a puncturing recess 216 and a window 222. Further, the device 202 includes flared end portions 250 and at least one pill removal opening 252. The flared end portions 250 facilitate a more secure grip of the device 202 by a user, and the pill removal opening 252 provides access for the user to engage the capsule 203 or pill with a needle or other elongated member and urge the capsule 203 out of the cavity 210 and away from the device 202 once extraction of the capsule 203 is complete.

Figure 2A:
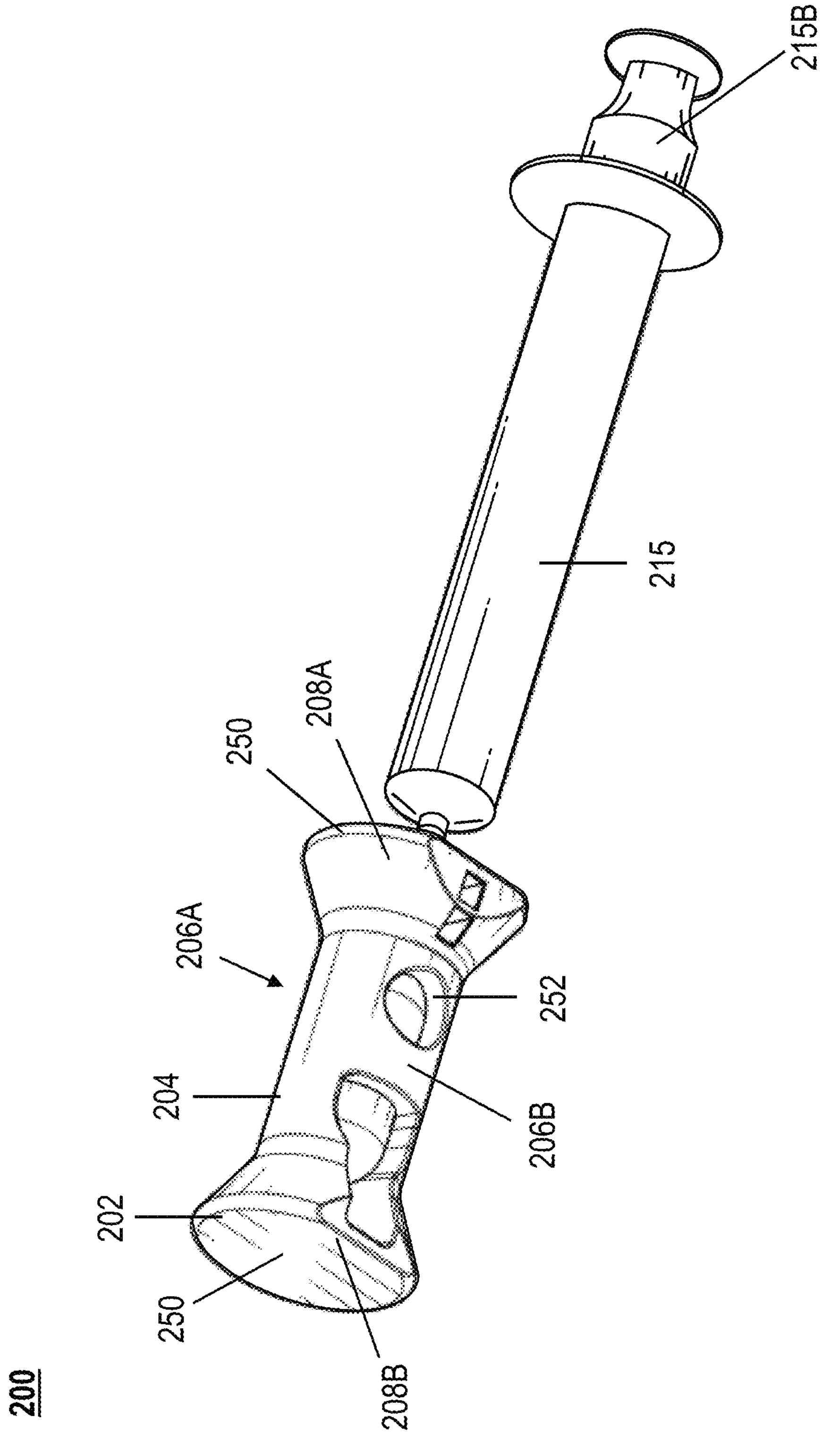
FIG. 2A is a perspective view of a system including another example of a device for liquid extraction from a capsule or other such container.
Figure 2B:
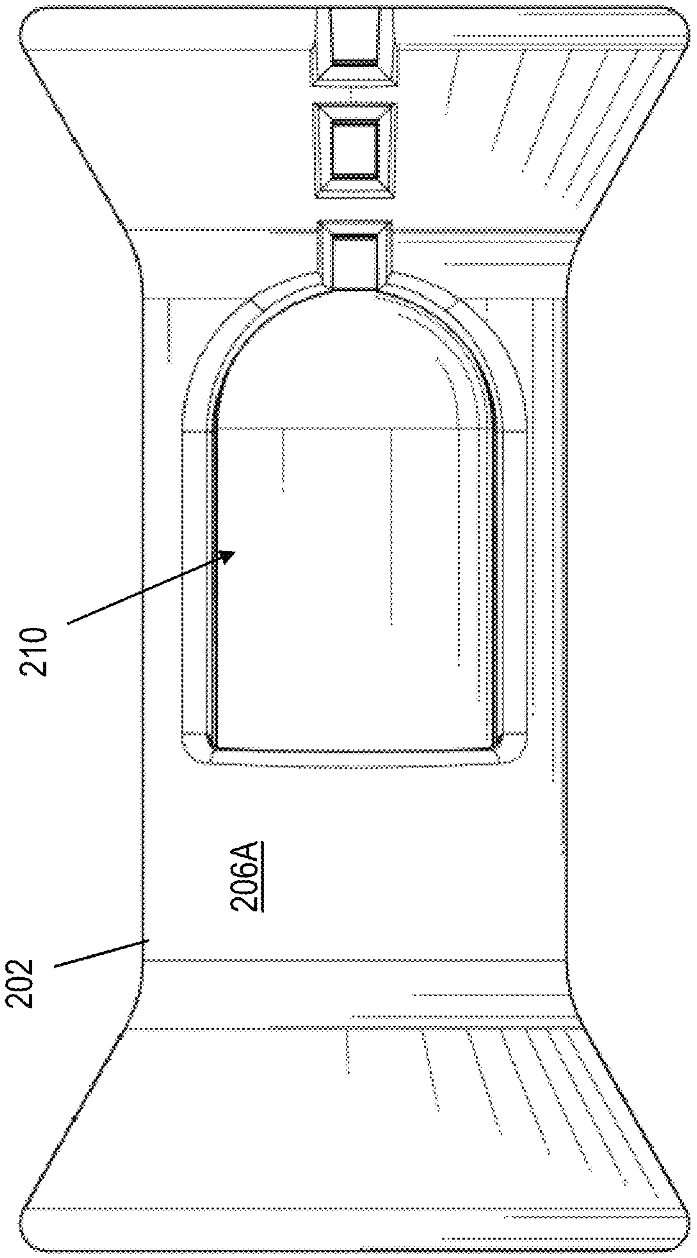
FIG. 2B is a side view illustrating a first side of the device of FIG. 2A.
Figure 2C:
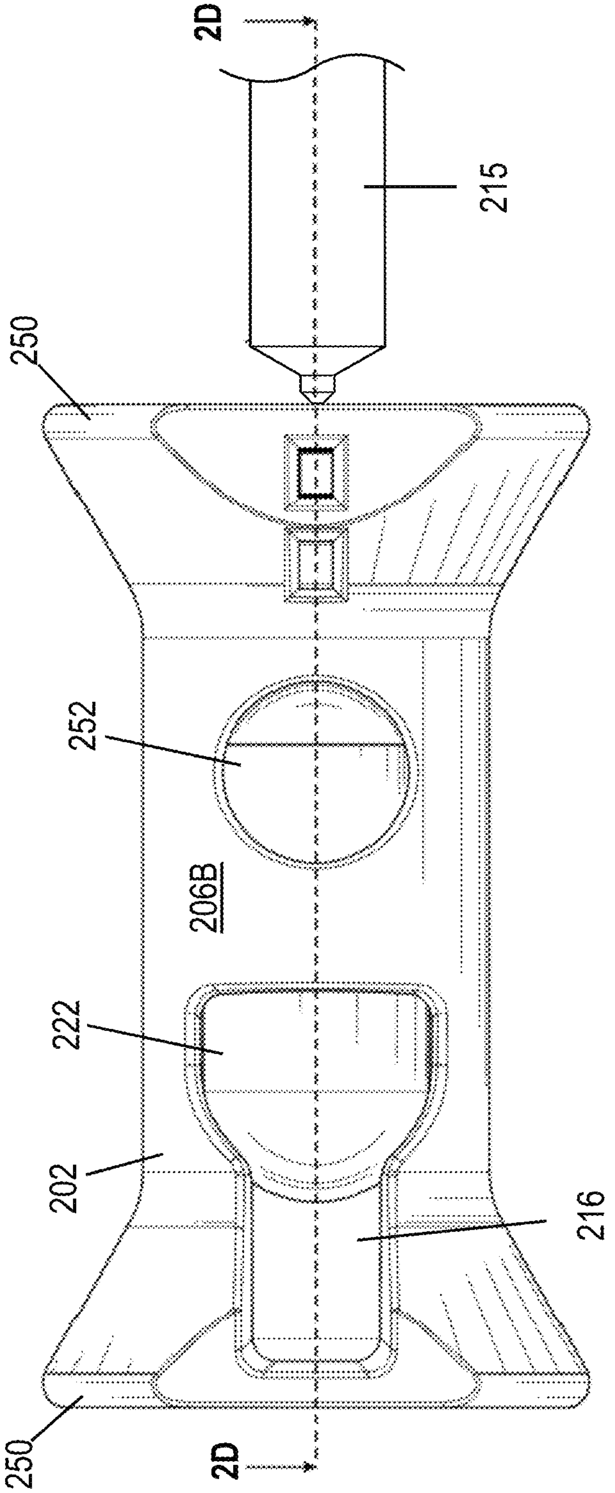
FIG. 2C is another side view illustrating a second side of the device of FIG. 2B.
Figure 2D:
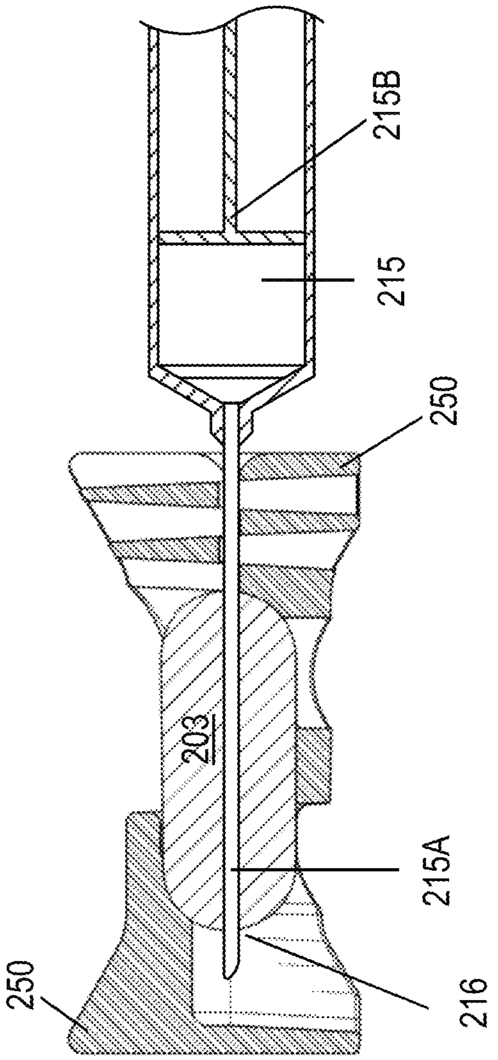
FIG. 2D is a cross section of FIG. 2C taken along the line 2D-2D of FIG. 2C.

Similarly, as shown in FIGS. 2C and 2D, the device 202 can be paired with a needle-syringe unit 215 including a needle 215A configured for insertion into the puncturing recess 216 to puncture the capsule 203 and a plunger 215B that enables a practitioner to draw liquid from the capsule 203 and into the needle-syringe unit 215.

Figure 3A:
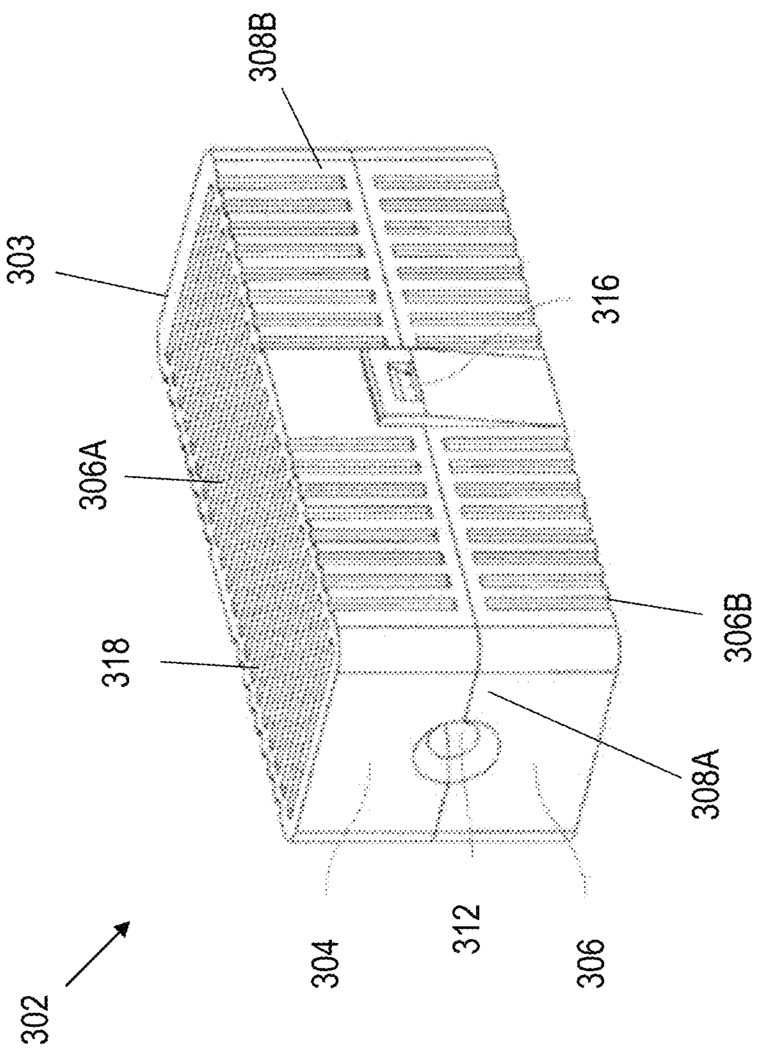
FIG. 3A is a perspective view of another example of a device for liquid extraction of a treatment from a capsule or other such container including a housing with a rectangular shape configuration and defining ridges or other such textured surface features.
Figure 3B:
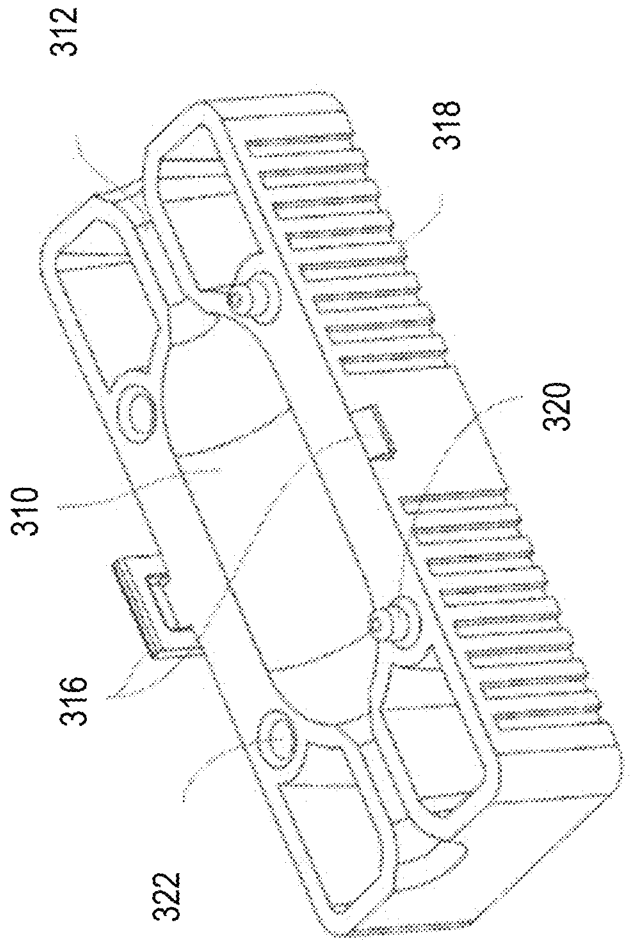
FIG. 3B is a perspective view of a portion (first body) of the example device of FIG. 3A.

Referring to FIGS. 3A-3B, another example of a device is shown, designated device 302, for liquid extraction (e.g., of a pill or capsule). In the present example, the device 302 includes a housing 303 defined collectively by a first body 304 and a second body 306 that mounts or otherwise engages to the first body 304 in the general manner shown. As indicated, the housing 303 defines a first side 306A and a second side 306B opposite the first side 306A. The housing 303 further defines a proximal portion 308A and a distal portion 308B on opposite ends of the housing 303 as shown.

In this example, the device 302 further includes a cavity 310 defining a first cavity portion, and a second cavity portion. The device 302 further includes at least one channel or needle canal 312, at least one of a clip 316, texturing or textured surfaces 318 along the device 302, a plurality of pins 320, and a plurality of pin holes 322. For demonstration purposes only, the engagement of the first body 304 and the second body 306 is shown as a closed configuration in FIG. 3A, while the non-engagement of the first body 304 and the second body 306 provides an open configuration. Where the first body 304 and the second body 306 are in the closed configuration shown in FIG. 3A, the first channel 312 of the first body 304 and second body 306 may form a first needle canal and the second channel 314 of the first body 304 and second body 306 may form a second needle canal. Similarly, where the first body 304 and the second body 306 are in the closed configuration, the first cavity portion and the second cavity portion collectively form the cavity 310 that receives and secures a capsule such as the capsule 103 of FIG. 1B.

In some embodiments, the plurality of pins 320 is configured to align with the corresponding plurality of pin holes 322 and collectively define an alignment mechanism. In other words, aligning the plurality of pin holes 322 with the plurality of pins facilitates engagement of the first body 304 with the second body 306 to form the closed configuration. Other such alignment mechanisms are contemplated.

In some embodiments, the clip 316 (or clips) defines a securing mechanism. Solely for the purpose of illustration, each clip 316 may each comprise a catch and a knob. When the device 302 is arranged in the closed configuration, the corresponding catches and knobs may apply a biasing force to sustain the device 302 in the closed configuration.

In some embodiments, a capsule or pill may be accepted be disposed along the cavity 310. By way of example only, a needle may be inserted into either of the formed needle canals, such that the needle punctures the capsule. The needle may need to puncture through substantially the entire capsule, such that the needle enters through one of the needle canals, and the tip of the needle rests inside the other needle canal. For demonstration purposes only, the first needle canal and the second needle canal may be substantially positioned along the same axis. In other embodiments, the first needle canal may be positioned substantially along a different axis than the second needle canal. Further, a medical professional can reposition the tip of the needle to rest substantially inside the capsule and utilize a syringe to extract the medication from the pill.

In some embodiments, the first body 304 and the second body 306 may comprise texturing. For illustrative purposes only, the texturing may comprise ridges, such that the device 302 has the textured surface 318 that facilitate a more secure engagement by a hand of a user. In addition, the first body 304 and the second body 306 may comprise a rectangular configuration when placed into the closed configuration. Moreover, the engagement of the first body 304 and the second body 306 may be of a peripheral configuration.

Figure 4A:
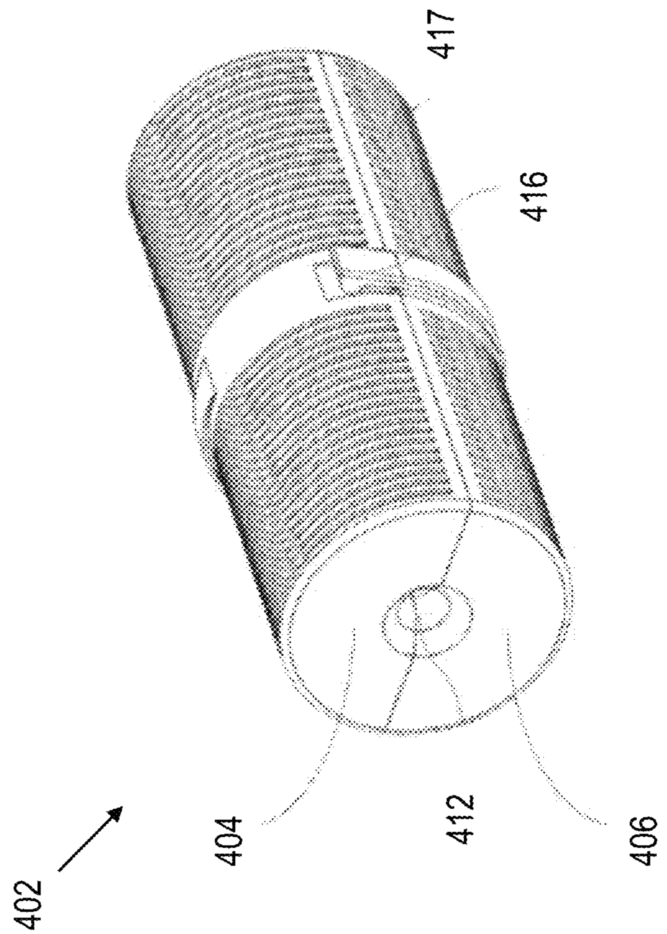
FIG. 4A is a perspective view of another example of a device for liquid extraction of a treatment from a capsule or other such container with a cylindrical-shaped configuration.
Figure 4B:
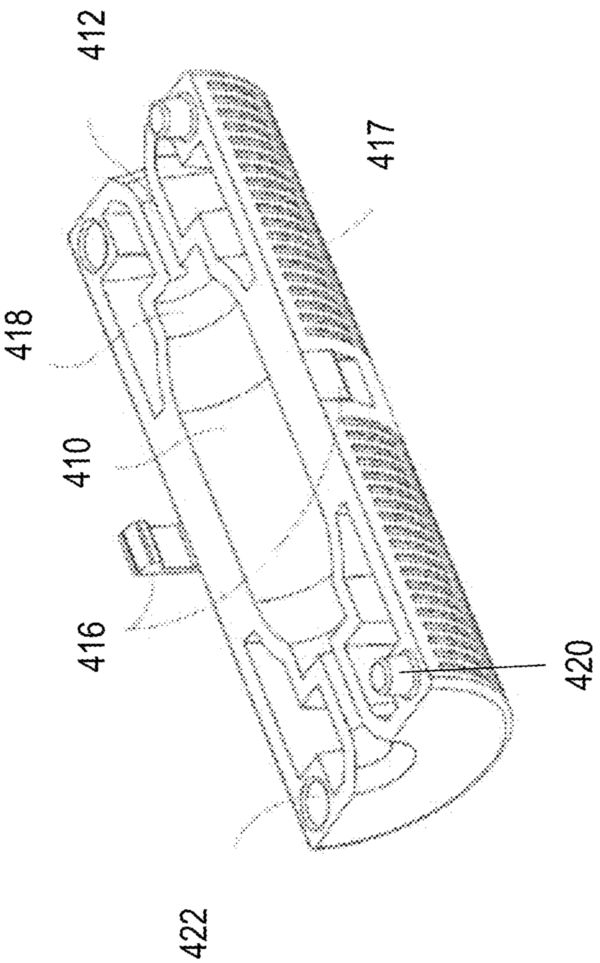
FIG. 4B is a perspective view of a portion (first body) of the example device of FIG. 4A.

FIGS. 4A-4B illustrate another embodiment of a device, designated device 402. The device 402 may include first body 404, a second body 406, a cavity 410 defining a first cavity portion and a second cavity portion, at least one channel 412, at least one clip 416, ridges 417, a puncturing recess 418, a plurality of pins 420, and a plurality of pin holes 422. For demonstration purposes only, the engagement of the first body 404 and the second body 406 is shown as a closed configuration, while the non-engagement of the first body 404 and the second body 406 is shown as an open configuration. Where the first body 404 and the second body 404 are in the closed configuration, the first channel of the first body 404 and second body 406 may form a first needle canal and the second channel of the first body 404 and second body 406 may form a second needle canal.

In general, the device 402 includes similar structure as compared with the device 302. However, the device 402 is tubular or cylindrical. Accordingly, the clip 416. Accordingly, various structural components, such as the clip 416, are modified to accommodate the different shape configuration. Specifically, the clip 416 can be shaped to wrap around the exterior surfaces of the device 402 to maintain the closed configuration.

Figure 5:
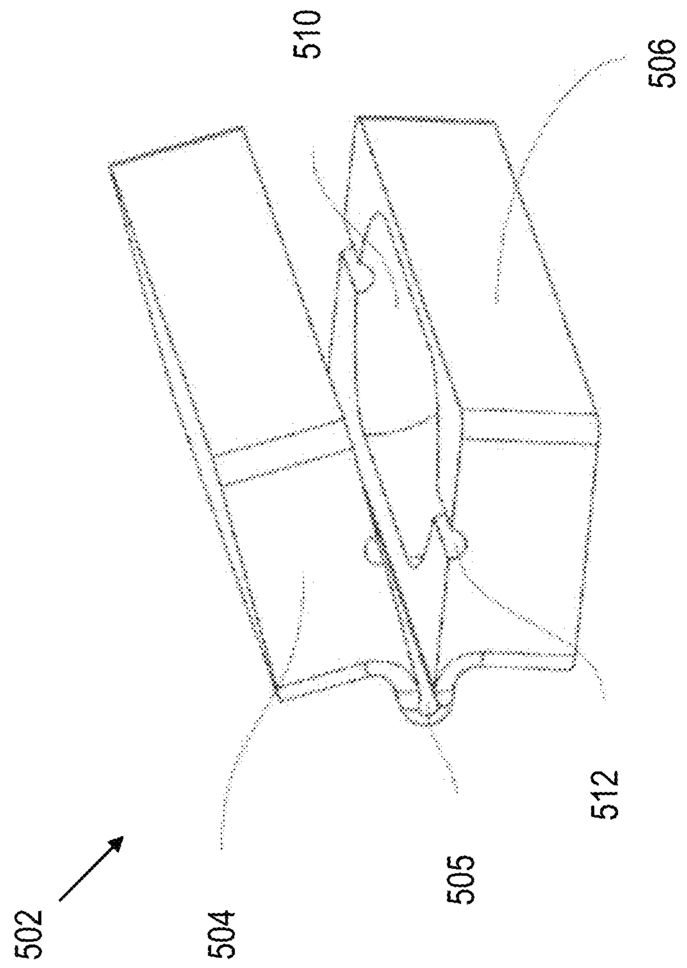
FIG. 5 is a perspective view of another example of a device for liquid extraction of a treatment from a capsule or other such container comprising a general box shape configuration and hinge closure system for securing a capsule.
Figure 6A:
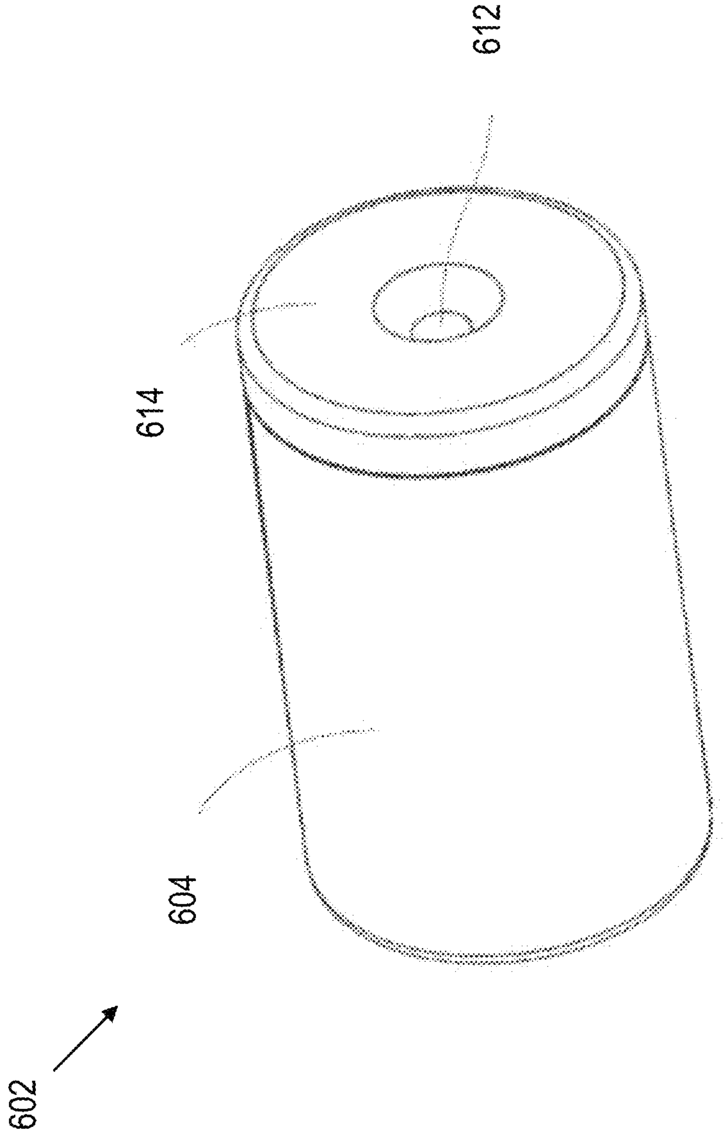
FIG. 6A is a perspective view of another example of a device for liquid extraction of a treatment from a capsule or other such container having a general cylindrical housing and a cap for enclosing the housing.
Figure 6B:
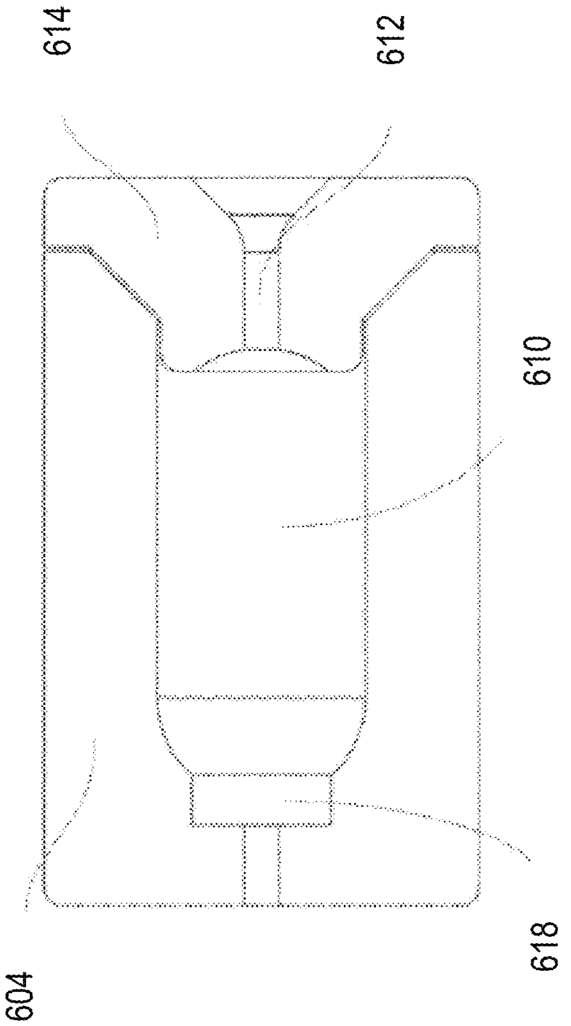
FIG. 6B is a cross-sectional view of the example device of FIG. 6A illustrating engagement of a needle of a needle-syringe unit with the subject device.
Figure 6C:
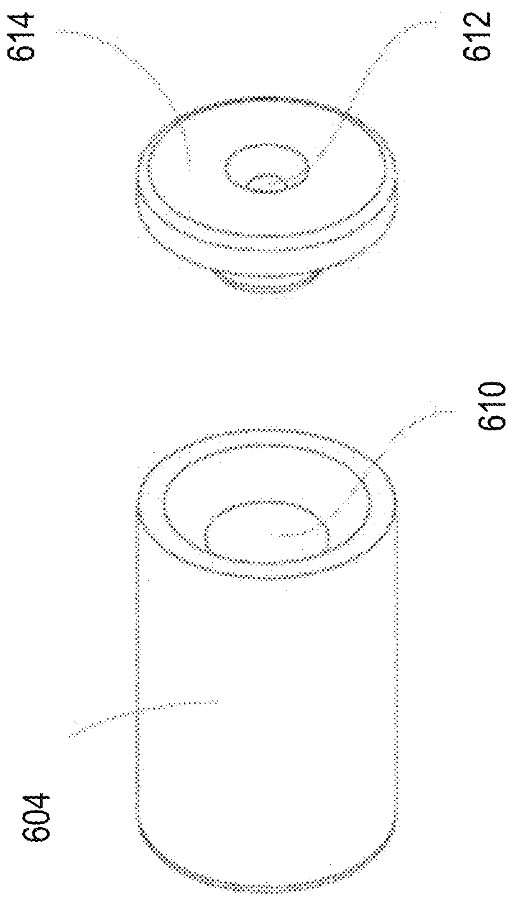
FIG. 6C is a front perspective view of the device of FIG. 6A illustrating the cap separated from the housing body.
Figure 6D:
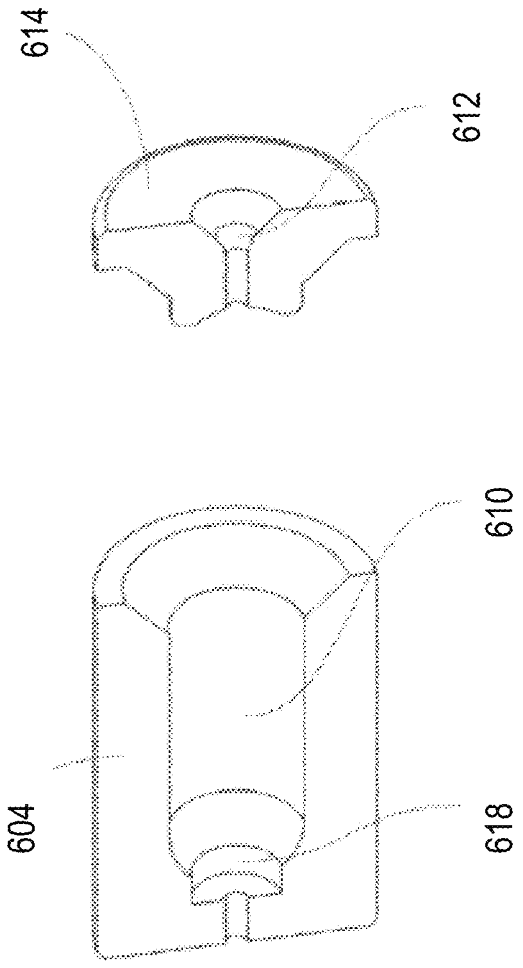
FIG. 6D is a perspective cross-sectional view of the device of FIG. 6A with the cap separated from the housing body.
Figure 6E:
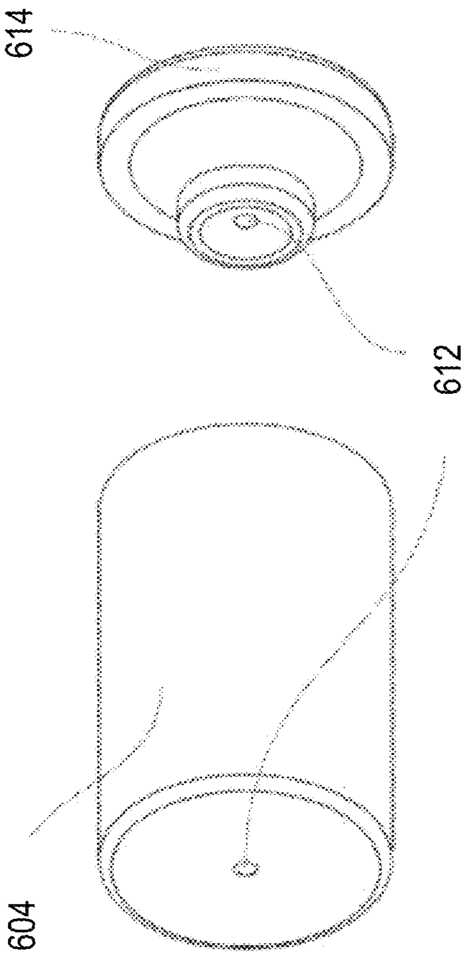
FIG. 6E is a back-perspective view of the device of FIG. 6A with the cap separated from the housing body.

FIG. 5. illustrates another embodiment of a device, designated device 502. The device 502 may include a first body 504 engaged to a second body 506 along a hinge 505 or other such closure mechanism. As indicated, the device 502 further includes a cavity 510. The hinge 505 facilitates engagement of the first body 504 over the second body 506 as shown. The device 502 further includes at least one channel (needle channel) in communication with the cavity 510. Any of the device examples described herein may include such a hinge 505.

Referring to FIGS. 6A-6E another embodiment of a device is illustrated, designated device 602. The device 602 may include a body 604 defining a cavity 610, at least one needle canal 612 in communication with the cavity 610, a cap 614, and a puncturing recess 618. For demonstration purposes only, the engagement of the body 604 and the cap 614 is shown as a closed configuration, while the non-engagement of the body 604 and the cap 614 is shown as an open configuration.

In some embodiments, a capsule or pill may be received within the cavity 610. If a capsule is disposed within the cavity 610, a medical professional may be able to place the cap 614 on one end of the body 604 to reconfigure the device 602 from the open configuration to the closed configuration. If the device 602 is in the closed configuration, then the cap 614 may be configured and arranged to secure the capsule inside the cavity 610 of the body 604. In addition, the body 604 may comprise a cylindrical shape configuration. Furthermore, and for example, the cap 614 may be peripheral to the body 604.

Figure 7:
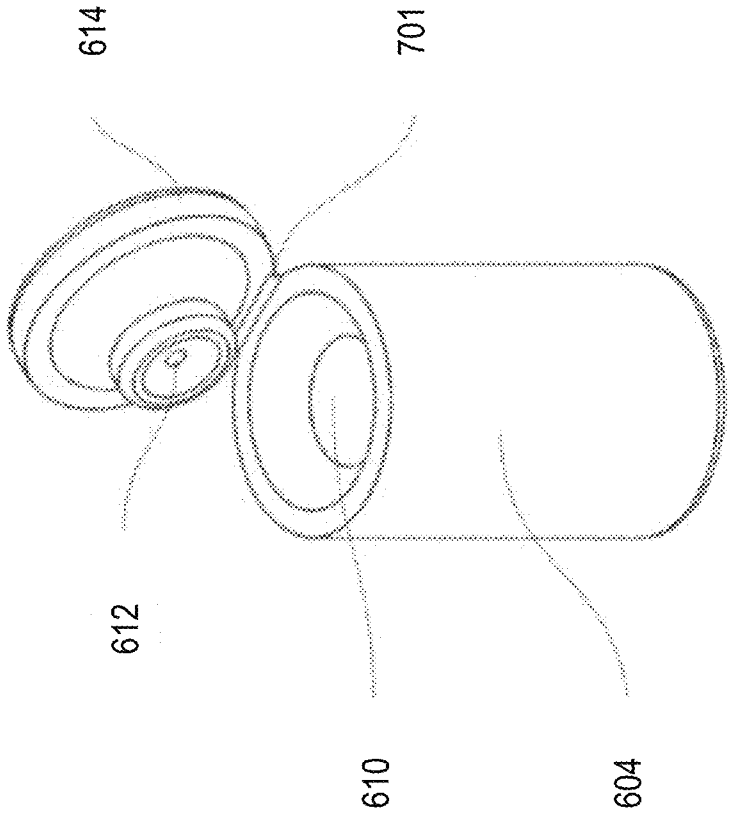
FIG. 7 is a perspective view of another example of a device for liquid extraction of a treatment from a capsule or other such container similar to the device of FIG. 6A having a hinge enclosure mechanism coupling the cap to the housing body.

In some embodiments, if the device 602 is in the closed configuration, the needle canal of the body 604 may be positioned in substantially the same axis as the needle canal of the cap 614. In other embodiments, the needle canal of the body 604 may be positioned substantially along a different axis than the needle canal of the cap 614. Moreover, if a capsule or pill is in the cavity 610, a medical professional may insert a needle into either needle canal, such that the needle punctures the capsule. The needle may need to puncture through substantially the entire capsule, such that the needle enters through one of the needle canals, and the tip of the needle rests inside the other needle canal. Similarly, the tip of the needle may rest inside the puncturing recess 618. Moreover, the puncturing recess 618 may be located in or adjacent to the cavity 610. Further, the medical professional can now reposition the tip of the needle to substantially inside the capsule and utilize a syringe to extract the medication from the capsule. FIG. 7 illustrates a variation of the device 602 where a hinge 701 is implemented to couple the cap 614 to the body 604.

Figure 8A:
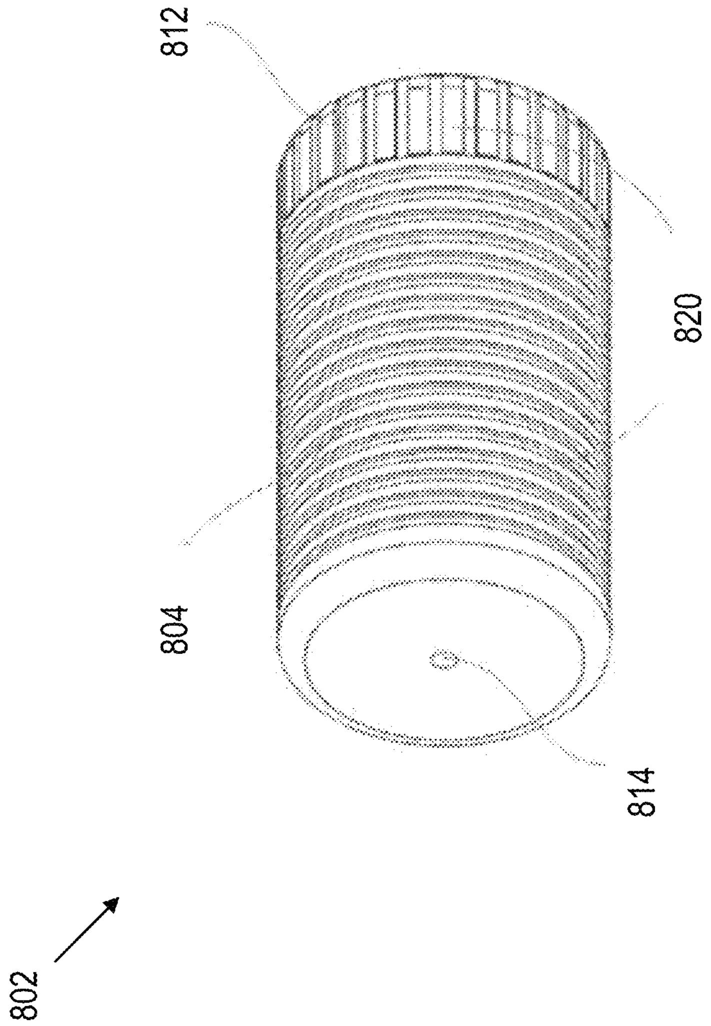
FIG. 8A is a perspective view of another example of a device for liquid extraction of a treatment from a capsule or other such container having a screw or thread closure system with a threaded housing portion and a threaded cap.
Figure 8B:
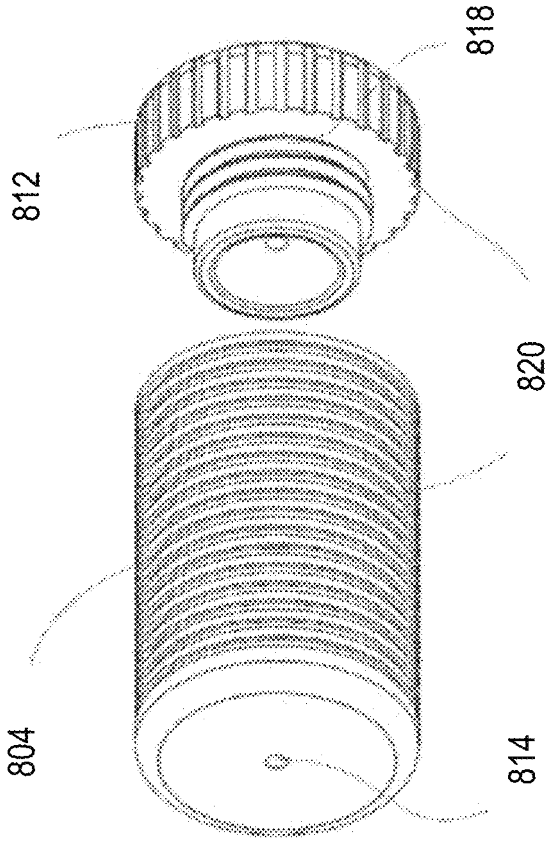
FIG. 8B is a perspective view of the device of FIG. 8A with the cap separated from the housing body.
Figure 8C:
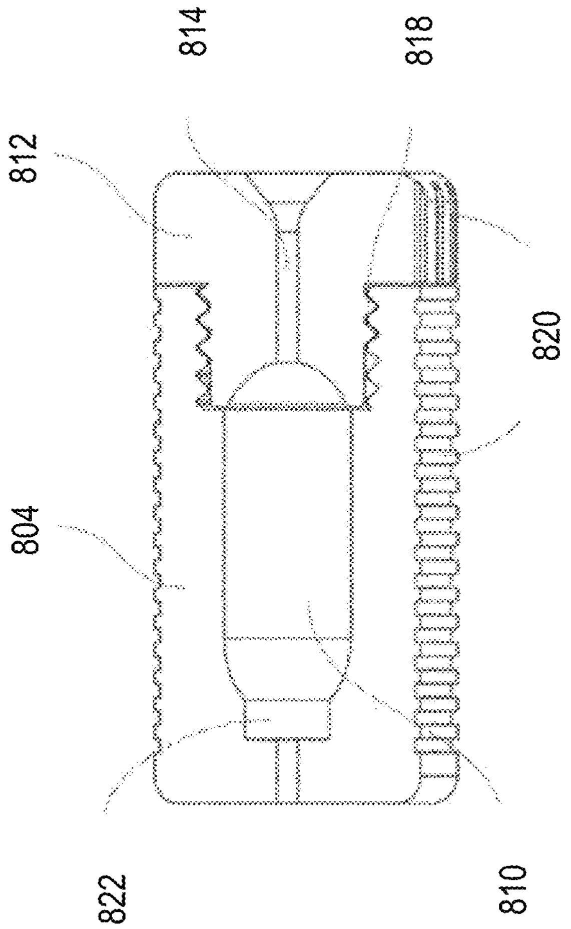
FIG. 8C is side cross-sectional view of FIG. 8A illustrating engagement of the cap to the housing body to secure a capsule.

FIGS. 8A-8C an embodiment of a device 602 that incorporates a threaded engagement between a body and a cap to enclose a capsule for puncture and extraction. The device 802 may include a body 804 defining a cavity 810, a cap 812, at least one needle canal 814, threads 818, texturing 820, and a puncturing recess 822. For demonstration purposes only, the engagement of the body 804 and the cap 812 is shown as a closed configuration, while the non-engagement of the body 804 and the cap 812 is shown as an open configuration.

In some embodiments, the body 804 may comprise texturing 820 or textured surfaces. For illustrative purposes only, the texturing 820 may comprise ridges, such that the device 802 has a textured surface that may be gripped by a medical professional. In addition, the body 804 may comprise a cylindrical shape configuration.

In some embodiments, a capsule or pill may be disposed within the cavity 810. If a capsule is secured within the cavity 810, a medical professional may be able to position the cap 812 on one end of the body 804 to reconfigure the device 802 from the open configuration to the closed configuration. If the device 802 is in the closed configuration, then the cap 812 may be configured and arranged to secure the capsule inside the cavity 810 of the body 804. Furthermore, and for example, the cap 812 may be peripheral to the body 804.

In some embodiments, the cap 812 may comprise a securing mechanism. By way of example only, the securing mechanism may comprise the threads 818. The medical professional may be able to position the cap 812 onto the body 804 by applying a rotational force to the cap 812. If a rotational force is applied to the cap 812, then the device 802 may be reconfigured into the closed configuration.

In some embodiments, if the device 802 is in the closed configuration, the needle canal 814 of the body may be positioned in substantially the same axis as the needle canal 816 of the cap 812. In other embodiments, the needle canal 814 of the body 804 may be positioned substantially along a different axis than the needle canal 816 of the cap 812. Moreover, if the capsule is in the cavity 810, a medical professional may insert a needle into either needle canal, such that the needle punctures the capsule. The needle may need to puncture through substantially the entire capsule, such that the needle enters through one of the needle canals, and the tip of the needle rests inside the other needle canal. Similarly, the tip of the needle may rest inside the puncturing recess 822. Moreover, the puncturing recess 822 may be located inside, in communication with, and/or adjacent the cavity 810. Further, the medical professional can now reposition the tip of the needle to substantially inside the capsule and utilize a syringe to extract the medication.

Figure 9A:
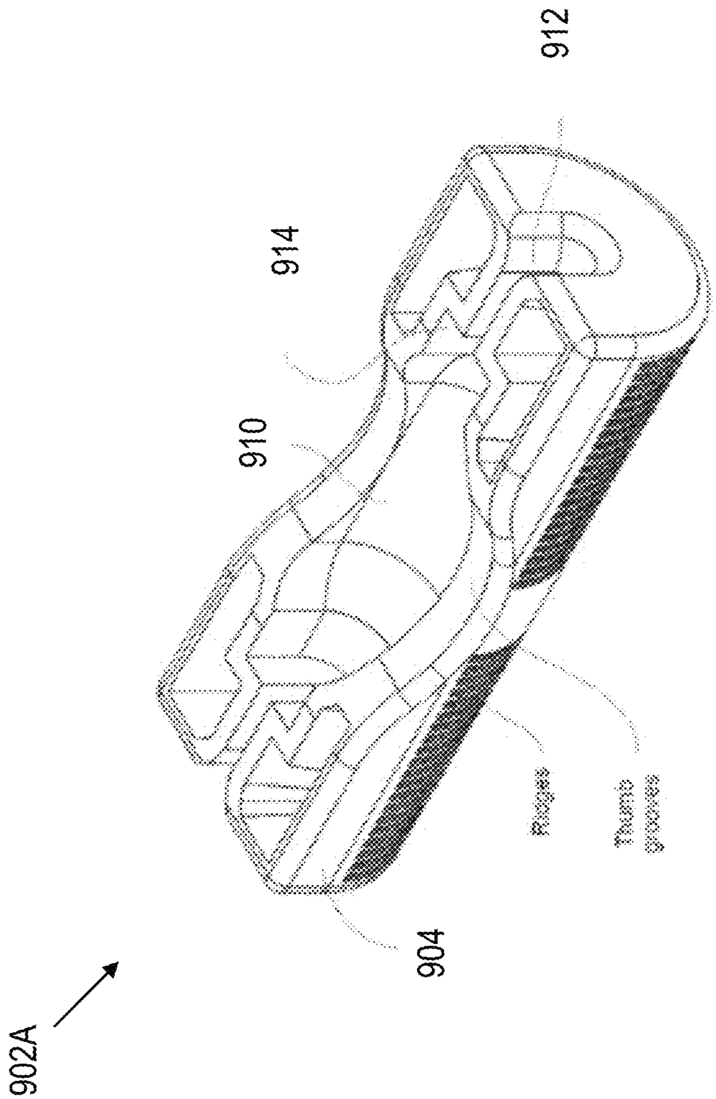
FIG. 9A is a perspective view of another example of a device for liquid extraction of a treatment from a capsule or other such container with an exposed cavity and needle canals.
Figure 9B:
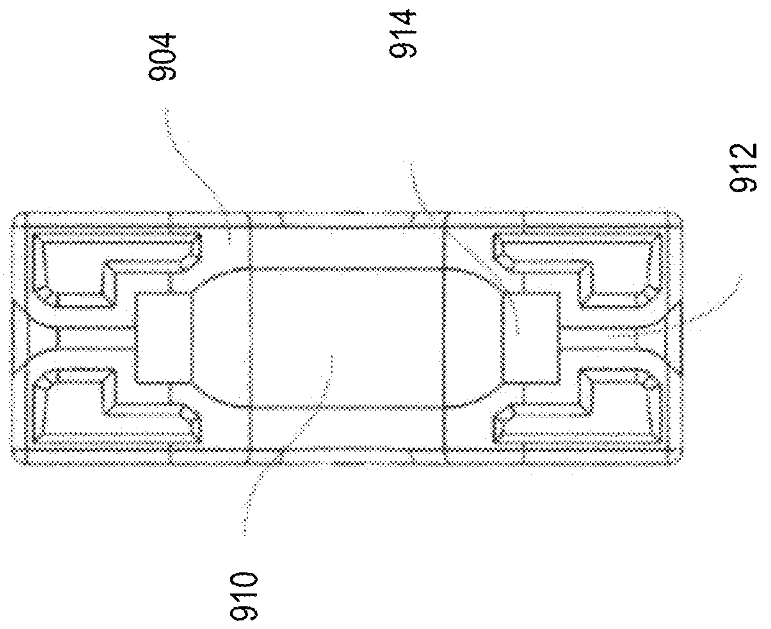
FIG. 9B is a top view of the device of FIG. 9A.
Figure 9C:
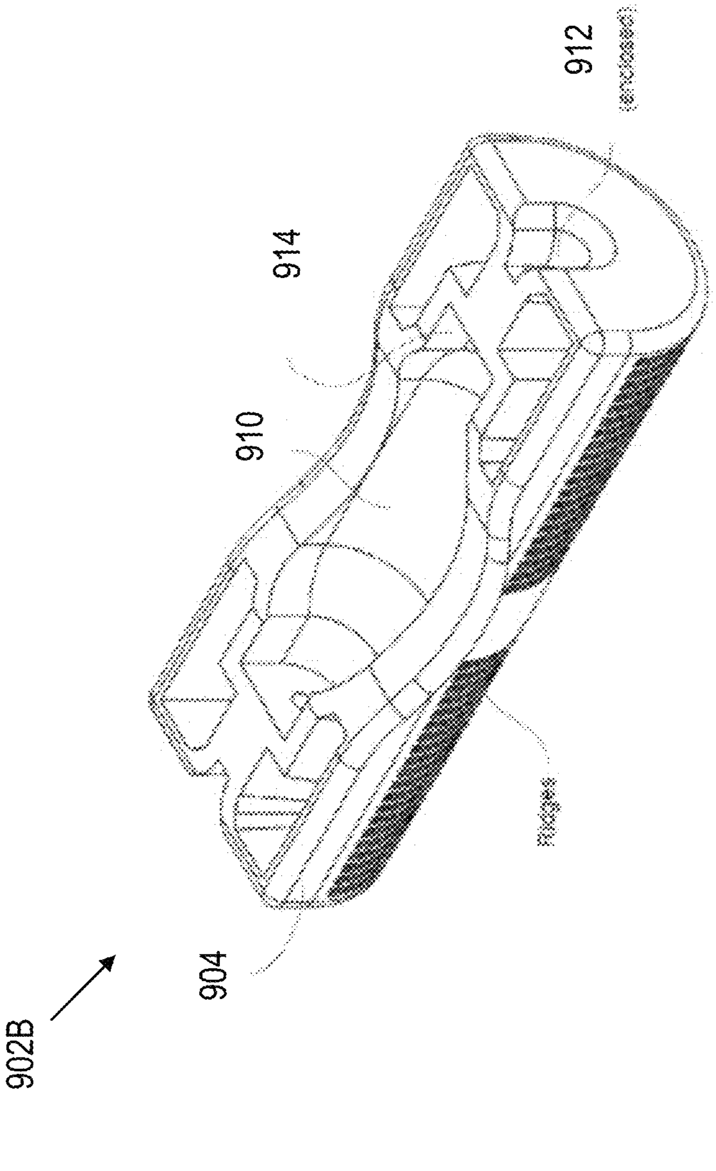
FIG. 9C is a perspective view of a variation of the example of FIG. 9A with enclosed needle canals and a clip for securing a capsule.

FIGS. 9A-9C illustrate an embodiment of a device 902 with various open or exposed portions. The device 902 may include a body 904 defining a cavity 910, at least one channel 912, and at least one puncture recess 914. For example, the at least one channel 912 may extend from an exterior surface of the body 904 to the cavity 910. The at least one channel 912 may take the form of two needle canals formed along opposite ends of the cavity 910.

In some embodiments, the at least one channel 912 may comprise an open configuration (902A) or an enclosed configuration (902B). In an open configuration, a given channel 912 may be exposed or uncovered. In this manner, when a needle is inserted by a medical professional into the channel 912, the needle rests inside the channel 912 and is viewable from a top view. In the enclosed configuration at least a portion of the channel 912 may be covered or enclosed similar to a cylinder or a tunnel.

In some embodiments, the device 902 includes a securing mechanism 920 that may comprise a hinge (not shown) and/or a securing bar (not shown). For demonstration purposes only, the hinge may allow the securing bar to move to substantially not blocking the cavity so that a pill can be inserted by a medical professional. If a pill is inserted into the cavity, the hinge may allow the support bar to be placed substantially over the pill, such that a biasing force may be applied to the pill to secure the pill in the cavity. By way of example only, a catch and knob can be employed on an end of the bar substantially opposite of the hinge. The support bar may be placed over the pill, then the catch my engage the knob, where at least one is located on the support bar, and the other is located on the body.

In some embodiments, the securing mechanism 920 may comprise an elastic mechanism. For the sole purpose of illustration only, the elastic mechanism may comprise a rubber member that may continuously apply a biasing force overtop of the cavity 910. For example, a medical professional may substantially pull the rubber member out of the way and then may insert a capsule or pill into the cavity 910. If the capsule is inserted into the cavity 910, the medical professional may release the rubber member, which may cause the biasing force to apply to the capsule, securing the capsule in the cavity 910.

In some embodiments, the body 904 may comprise texturing. For demonstration purposes only, the texturing may comprise ridges, such that the device 902 has a textured surface that may be gripped by a medical professional. In addition, the body 904 may have a cylindrical configuration. In other embodiments, the body 904 may comprise other shape configurations, such as a rectangular configuration or a polygonal configuration.

Figure 10A:
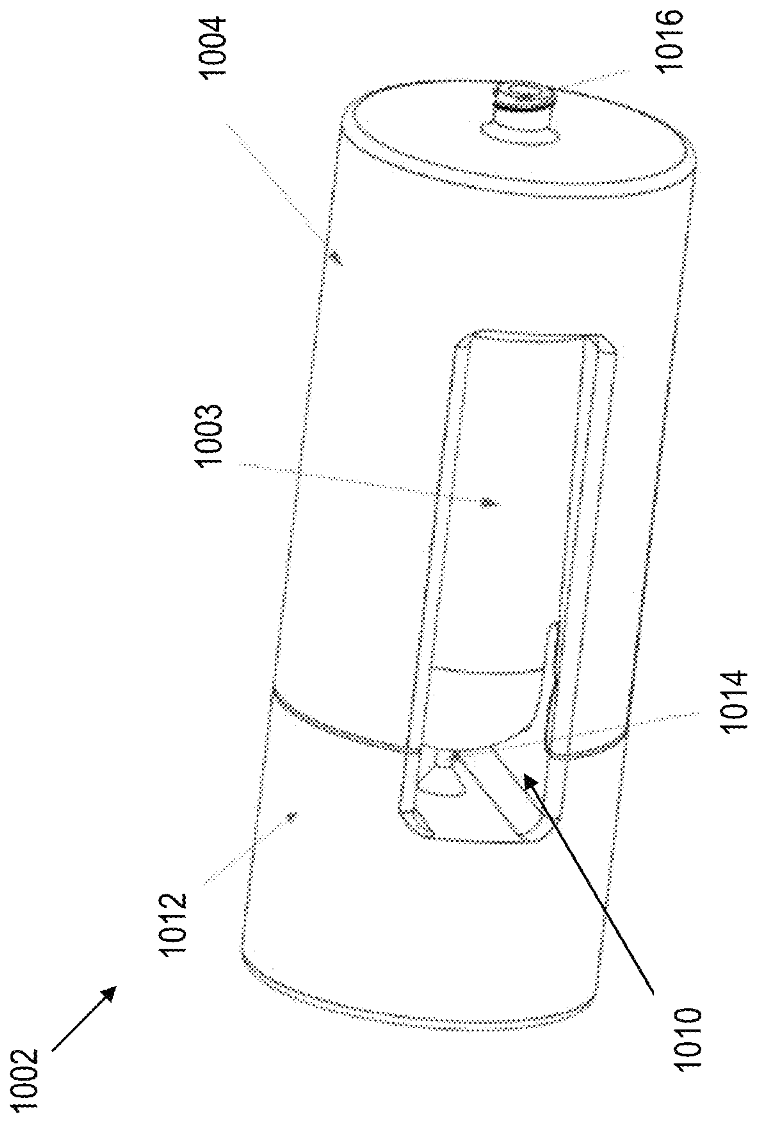
FIG. 10A is perspective view of another example device for puncture and extraction of a capsule that includes a vacuum release puncture element or integrated needle.
Figure 10B:
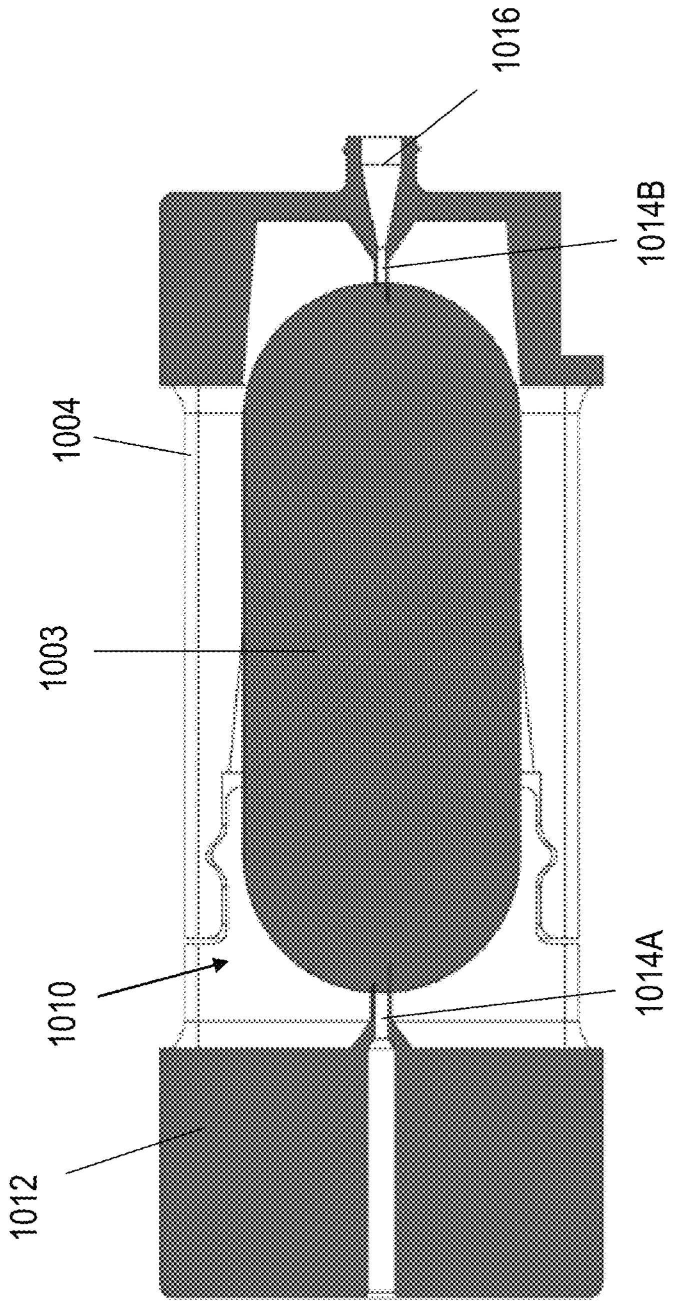
FIG. 10B is a cross-section of the device of FIG. 10B.

Referring to FIGS. 10A-10B, one embodiment of a device 1002 for secure puncture and extraction of a capsule 1003 may include a puncture element, mechanism, or integrated needle. As indicated, the device 1002 includes a main body 1004 defining a cavity 1010, a cap 1012, a first puncture element 1014A along an interior surface of the cap 1012 and a second puncture element 1014B along an interior surface of the main body 1004, where the second puncture element 1014B faces the first puncture element 1014A as shown. The first puncture element 1014A and the second puncture element 1014B both extend into the cavity 1010 and collectively apply a puncture to the capsule 1003, and a port 1016 which may receive a syringe. The first puncture element 1014A and the second puncture element 1014B may each include an integrated needle, edge, removable needle, and the like.

Figure 11:
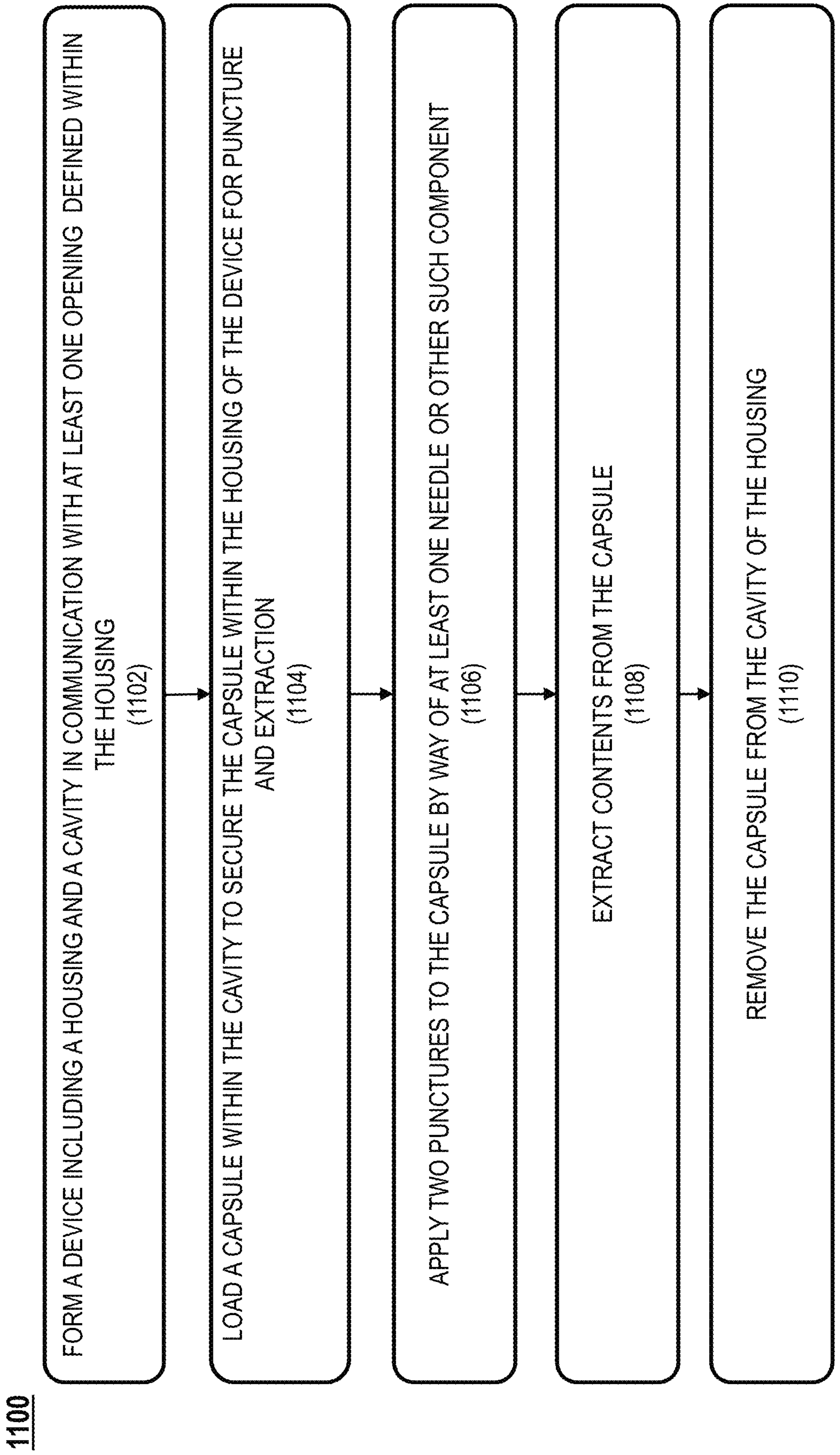
FIG. 11 is a simplified block diagram of an exemplary method associated with example devices described herein.

FIG. 11, including the process 1100, illustrates a general method of forming embodiments of the device described herein and non-limiting implementations thereof.

Various non-limiting features associated and implemented with any of the device examples are contemplated. As indicated in the following description, any of the examples of the device described herein can be constructed with a body shape that is rectangular, cylindrical, polygonal, or other such shape configurations to provide adequate grip and comfortability for holding. In some examples, the housing is hourglass shaped or includes flared terminal ends to reduce finger pricks and increase stability during use. In some examples, the housing of the device defines two separate bodies (first body and second body) which may be connected via a hinge other such closure mechanism. In such examples, the first body may define a primary body for resting a capsule, and the second body may provide a cap structure that secures the pill within the cavity). In some examples of the housing, the housing includes a cut-out with an open cavity such that a capsule can rest along the open cavity and be secured via a clip, band, or other such component.

In some examples, the device includes one or more needle canals that may be located on opposite ends to accommodate passage of a needle. Such needle canals may be beveled to facilitate insertion of the needle.

In some embodiments, the device includes at least one clip that brings together and/or maintains the bodies of a device housing in a closed configuration. Clips may also be implemented to wrap over a capsule disposed within a cavity to maintain the capsule within the cavity of a given device.

In some embodiments, the device includes any number or type of locating or alignment components such as pins and corresponding pin holes that, e.g., facilitate engagement of a first body of a housing with a second body of a housing to form a closed configuration. In some examples, the device includes a grip formed by a textured surface such which may include ridges, knurled portions, and the like. In some embodiments, the device includes a puncturing recess on either/both sides of the capsule cavity to allow the needle to puncture both sides of the pill on a single pass. In some embodiments, the device includes a bevel on the interior part of the needle canal to allow the needle to pass into the opposite side's needle canal and puncture both ends of the pill on a single pass.

In some examples, the device includes puncturing aids, integrated needles, or other such components that accommodate puncturing of a capsule or pill without need for an external needle. Puncturing aids may be on one or both sides of a given device (e.g., one for removal of the pill contents and one for creating air flow (removing vacuum in the pill)). Puncture aids may be formed with different lengths to optimize extraction. Puncture aids may puncture a capsule upon coupling device components or engaging them after components have been coupled/pill being contained. In some examples, the device includes a syringe attachment port located on the outside for the syringe to attach and allow extraction of contents without the need for a needle.

Some embodiments of the devices may comprise a puncturing mechanism defined inside a cavity of the device. For demonstration purposes only, if a medical professional placed a pill into the cavity of the device and reconfigured the device into a closed configuration, then the puncture mechanism may puncture the pill. Moreover, a syringe interface may be defined on the body. For example, the syringe interface may allow a medical professional to interface a syringe to the device so that the medical professional may be able to extract the medication from the pill through the puncture mechanism.

Similarly, some embodiments of the devices may comprise a puncturing mechanism defined inside a cap of the device. For illustrative purposes only, if a medical professional placed a pill into the cavity of the device and reconfigured the device into a closed configuration, then the puncture mechanism may puncture the pill. Moreover, a syringe interface may be defined on the body. For example, the syringe interface may allow a medical professional to interface a syringe to the device so that the medical professional may be able to extract the medication from the pill through the puncture mechanism.

Some embodiments of the devices may comprise a cutting mechanism defined on a body of the device. By way of example only, if a medical professional placed a pill into the cavity of the device and reconfigured the device into a closed configuration, then the cutting mechanism may be engaged to cut the pill. The medical professional can then extract the medicine from inside the pill.

Some embodiments of the devices may be reusable or disposable. For a reusable embodiment, the device may comprise a metallic material, such as stainless steel, substantially steel alloys, surgical grade steel, substantially titanium alloys, and substantially aluminum alloys. For a reusable embodiment, the device may need to be sterilized via autoclave.

For a disposable embodiment, the device may comprise a biocompatible polymer, resin, or injection molded thermoplastic. Possible biocompatible materials may include polyvinylchloride, polyethersulfone, polytetrafluoroethylene, polyethylene, polyurethane, polyetherimide, polycarbonate, polysulfone, polyetheretherketone, polypropylene, acrylonitrile butadiene styrene, polyamide, polystyrene, and polylactic acid. For a disposable embodiment, the device may need to be sterilized via ethylene oxide, gamma radiation, or a combination of both.

Some embodiments of the device may be utilized by a single medical professional. The medical professional may need to use both hands when placing the pill inside the device. Next, the medical professional can use one hand to hold the device while using the other hand to extract the medication, possibly utilizing a needle and syringe.

Some embodiments of the device may be able to accept pills shaped round, square, rectangle, capsule, almond, pentagon, oval, lozenge, diamond, triangle, core rod, and heart. Some embodiments of the device may be able to accept pills with a profile that is shallow, standard, deep, X-deep, mod. Ball, compound cup, convex bevel edge, flat face bevel edge, and flat face radius edge.

Some embodiments of the device may be able to accept pills in the form of capsules, spansules, soft gels, and tablets. Some embodiments of the device that accept capsules, may accept capsules of size 000, 00E, 00, OE, 0, 1, 2, 3, 4, 5, and in between 000 and 5. Some embodiments of the device may be able to accept capsules of sizes greater than 000 and less than 5.

Some embodiments of the device may accept soft gels of the oval shape. Some embodiments of the device that accept soft gels of the oval shape may accept sizes of 1, 2, 3, 4, 6, 7, 7.5, 8, 8.5, 10, 11, 12, 13, 14, 16, 18, 20, 22, 24, 30, 40, 60, 65, 80, and in between 1 and 80. Some embodiments of the device may be able to accept soft gels of the oval shape of sizes greater than 80 and less than 1.

Some embodiments of the device may accept soft gels of the oblong shape. Some embodiments of the device that accept soft gels of the oblong shape may accept sizes of 3, 4, 5, 8, 9, 9.5, 10, 11, 12, 14, 16, 17, 18, 20, 22, 24, 25, 26, and in between 3 and 26. Some embodiments of the device may be able to accept soft gels of the oblong shape of sizes greater than 26 and less than 3. Some embodiments of the device may accept soft gels of the suppository shape. Some embodiments of the device that accept soft gels of the suppository shape may accept sizes of 6, 10, 12, 40, 80, and in between 6 and 80. Some embodiments of the device may be able to accept soft gels of the suppository shape of sizes greater than 80 and less than 6.

It is contemplated and within the scope of the present disclosure that features of specific device examples are not mutually exhaustive, i.e., features may be shared by multiple examples set forth herein, and hybrid examples are fully contemplated.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A device for improved liquid extraction from a capsule, comprising:

a housing defining a first side and a second side, the housing including a first body defining a first indentation, and a second body defining a second indentation;

a cavity defined between the first side and the second side of the housing that receives a capsule and maintains the capsule in a fixed position relative to the housing, wherein the cavity is defined within the housing collectively by the first indentation and the second indentation;

a first opening formed along a proximal portion of the housing that provides access to the cavity; and a puncture arrangement defined along the housing and the cavity that accommodates at least one puncture of the capsule via a needle or sharp object for extraction of a liquid from the capsule via the first opening, wherein a closed configuration of the first body and the second body comprises:

a first needle canal defined by a first channel of the first body and a first channel of the second body; and a second needle canal defined by a second channel of the first body and a second channel of the second body.

2. The device of claim 1, wherein the puncture arrangement is configured to:

receive an external needle of a needle-syringe unit through the first opening and into the cavity accommodating a first puncture and a second puncture along different sides of the capsule to extract the liquid from the capsule.

3. The device of claim 1, further comprising:

a recess formed within the housing and in communication with the cavity opposite the first opening, the recess permitting passage of the needle through a length of the cavity to accommodate a puncture of the capsule along a distal portion of the housing opposite the proximal portion.

4. The device of claim 3, further comprising:

a second opening formed along a distal portion of the housing in communication with the recess, the second opening accommodating passage of the needle from the proximal portion to the distal portion of the housing.

5. The device of claim 1, wherein the puncture arrangement includes:

an integrated needle defined by the puncture arrangement along the housing such that the integrated needle is in communication with the cavity, the integrated needle accommodating a puncture of the capsule.

6. The device of claim 5, wherein the integrated needle engages with a syringe to accommodate extraction of the liquid from the capsule.

7. The device of claim 1, further comprising:

a window defined along the first side of the housing that provides viewing access to the cavity.

8. The device of claim 1, wherein the capsule comprises a capsule including liquid contents encapsulated within an encapsulating layer, the housing securing the capsule to accommodate two punctures and extraction of the liquid contents from the capsule via the first opening.

9. The device of claim 1, wherein the first body and the second body are configured and arranged to be positioned in a substantially open configuration and a substantially closed configuration.

10. The device of claim 1, further comprising:

an alignment mechanism defined along the housing and arranged to align engagement of the first body and the second body when the first body and the second body are in a closed configuration.

11. The device of claim 1, further comprising:

a securing mechanism defined along the housing configured and arranged to at least temporarily secure engagement of the first body with the second body and align the first indentation with the second indentation.

12. The device of claim 1, wherein a distal portion and the proximal portion of the housing include flared terminal end elements for improved grip and finger protection.

13. The device of claim 1, further comprising:

a removal opening formed along the housing, the removal opening accommodating removal of the capsule from the cavity of the housing.

14. A device for improved medication extraction, comprising:

a housing defining a first side and a second side, the housing including a first body defining a first indentation and a second body defining a second indentation;

a cavity defined between the first side and the second side of the housing that receives a capsule and maintains the capsule in a fixed position relative to the housing; and at least one opening formed along the housing and in communication with the cavity that accommodates puncture and extraction of the capsule, wherein a closed configuration of the first body and the second body comprises:

a first needle canal defined by a first channel of the first body and a first channel of the second body; and a second needle canal defined by a second channel of the first body and a second channel of the second body.

15. The device of claim 14, wherein the housing includes a first body along the first side and a second body along the second side.

16. The device of claim 14, wherein the housing includes a sole body, and at least a portion of the cavity is exposed over the sole body.

17. A method of making a device for improved extraction of liquid contents from a capsule for treatment administration, comprising:

providing a housing including a cavity, the housing configured for receiving a capsule and maintaining the capsule in a fixed position relative to the housing, the housing including a first body defining a first indentation and a second body defining a second indentation and wherein the cavity is defined within the housing collectively by the first indentation and the second indentation;

forming a first opening formed along a proximal portion of the housing that provides access to the cavity; and forming a puncture arrangement along the housing and the cavity that accommodates at least one puncture of the capsule via a needle for extraction of a treatment from the treatment, wherein a closed configuration of the first body and the second body comprises:

a first needle canal defined by a first channel of the first body and a first channel of the second body; and a second needle canal defined by a second channel of the first body and a second channel of the second body.

18. A method for liquid extraction from a capsule utilizing a device, the method comprising:

providing a capsule puncturing device comprising at least a housing, a cavity defined within the housing, and a first opening providing access to the cavity, the housing including a first body defining a first indentation and a second body defining a second indentation and wherein the cavity is defined within the housing collectively by the first indentation and the second indentation;

loading a capsule within the cavity, the capsule encapsulating liquid contents;

inserting a needle of a needle-syringe unit through the first opening into the capsule to puncture the capsule; and extracting the liquid contents from the capsule, wherein a closed configuration of the first body and the second body comprises:

a first needle canal defined by a first channel of the first body and a first channel of the second body; and a second needle canal defined by a second channel of the first body and a second channel of the second body.

19. The method of claim 18, further comprising:

removing the capsule from the cavity of the housing post-extraction.

20. The method of claim 18, further comprising:

aligning a first body of the housing over a second body of the housing to form the cavity and secure the capsule.

* * * * *